(12) United States Patent
Hoagland et al.

(10) Patent No.: US 11,597,041 B2
(45) Date of Patent: Mar. 7, 2023

(54) EXOTHERMIC REACTION WELDING MOLDS, WELD-METAL CONTAINING CARTRIDGES FOR SUCH MOLDS, AND METHODS OF USE

(71) Applicant: HUBBELL INCORPORATED, Shelton, CT (US)

(72) Inventors: Timothy Charles Hoagland, Tulsa, OK (US); Todd Carlton Lehmann, Broken Arrow, OK (US); Mamoon Tawfiq Abedraboh, Tulsa, OK (US); Xiaochen Wu, Owasso, OK (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 17/560,372

(22) Filed: Dec. 23, 2021

(65) Prior Publication Data
US 2022/0111472 A1 Apr. 14, 2022

Related U.S. Application Data

(62) Division of application No. 16/269,025, filed on Feb. 6, 2019, now Pat. No. 11,358,242, which is a division
(Continued)

(51) Int. Cl.
*B23K 35/00* (2006.01)
*B23K 37/00* (2006.01)
(Continued)

(52) U.S. Cl.
CPC .......... *B23K 35/0261* (2013.01); *B23D 19/04* (2013.01); *B23K 20/165* (2013.01);
(Continued)

(58) Field of Classification Search
CPC .... B23K 23/00; B23K 37/06; B23K 2101/26; B23K 25/00; B23K 37/0443; B23K 1/0006
See application file for complete search history.

(56) References Cited

U.S. PATENT DOCUMENTS

| | | |
|---|---|---|
| 1,355,224 A | 10/1920 | Gravell |
| 1,838,357 A | 12/1931 | Bottrill |
| (Continued) | | |

FOREIGN PATENT DOCUMENTS

| | | |
|---|---|---|
| CN | 104139241 | 11/2014 |
| EP | 0222736 | 5/1987 |
| WO | 03/064095 | 8/2003 |

OTHER PUBLICATIONS

Extended European Search Report dated Aug. 13, 2018 in corresponding European Patent Application No. 16784061.0, 10 pages.
(Continued)

*Primary Examiner* — Erin B Saad
(74) *Attorney, Agent, or Firm* — Ruggiero, McAllister & McMahon LLC

(57) ABSTRACT

Exothermic welding molds, weld-metal containing cartridges for such molds, and methods of use are provided. The mold, cartridges, and methods can provide interaction between the cartridge's disk member with the mold, which allows the housing member to be withdrawn from the mold while leaving the disk member and weld-metal in place. The interaction can be a rotational restraint alone, a vertical restraint alone, or combinations thereof. Alternately, the interaction can be an outward pressure on the housing member and/or disk member, a shear force on the housing member and/or disk member, or combinations thereof. The outward pressure on the housing member and/or disk member can alternately be provided without interaction between the disk member and the mold, but rather by the simple
(Continued)

application of an internal pressure to the cartridge. The internal pressure can be applied by squeezing the walls of the cartridge and/or by depressing a pusher member.

19 Claims, 20 Drawing Sheets

Related U.S. Application Data of application No. 15/137,247, filed on Apr. 25, 2016, now Pat. No. 10,239,162.

(60) Provisional application No. 62/152,651, filed on Apr. 24, 2015.

(51) Int. Cl.
| | |
|---|---|
| *B23K 35/02* | (2006.01) |
| *B23K 37/06* | (2006.01) |
| *B23K 20/16* | (2006.01) |
| *B23D 19/04* | (2006.01) |

(52) U.S. Cl.
CPC .......... *B23K 35/02* (2013.01); *B23K 35/0255* (2013.01); *B23K 37/06* (2013.01)

(56) References Cited

U.S. PATENT DOCUMENTS

| | | | |
|---|---|---|---|
| 2,229,045 A | 1/1941 | Cadwell | |
| 2,387,715 A | 10/1945 | Cadwell | |
| 2,569,956 A | 10/1951 | Schiltknecht | |
| 3,070,391 A | 12/1962 | Hofmann | |
| 4,250,944 A | 2/1981 | Moring | |
| 4,395,801 A | 8/1983 | Gabrielli | |
| 4,879,452 A | 11/1989 | Kovarik et al. | |
| 5,151,202 A * | 9/1992 | Bommart | B23K 23/00 249/86 |
| 5,195,515 A | 3/1993 | Levine | |
| 5,715,886 A * | 2/1998 | Fuchs | B23K 23/00 249/97 |
| 5,829,510 A | 11/1998 | Fuchs | |
| 6,227,282 B1 | 5/2001 | Kuster | |
| 6,484,792 B1 | 11/2002 | Plötz | |
| 6,776,386 B1 | 8/2004 | Morrissey et al. | |
| 6,793,003 B2 | 9/2004 | Triantopoulos et al. | |
| 6,835,910 B2 | 12/2004 | Moore et al. | |
| 7,240,717 B2 | 7/2007 | Lofton | |
| 7,721,937 B2 | 5/2010 | Siracki et al. | |
| 7,946,466 B1 * | 5/2011 | Lofton | B23K 23/00 228/234.3 |
| 7,950,568 B2 | 5/2011 | Stidham et al. | |
| 8,074,864 B2 | 12/2011 | Lofton et al. | |
| 8,581,149 B2 | 11/2013 | Stidham et al. | |
| 8,994,244 B2 | 3/2015 | Horst et al. | |
| 2003/0178168 A1 * | 9/2003 | Triantopoulos | B23K 23/00 249/86 |
| 2004/0003907 A1 | 1/2004 | Moore | |
| 2004/0222274 A1 | 11/2004 | Harger | |
| 2007/0017955 A1 | 1/2007 | Siracki et al. | |
| 2011/0240244 A1 | 10/2011 | Sepetak et al. | |
| 2012/0061454 A1 | 3/2012 | Rudd et al. | |
| 2012/0255699 A1 | 10/2012 | Sepelak et al. | |
| 2013/0199747 A1 | 8/2013 | Stidham et al. | |

OTHER PUBLICATIONS

International Search Report dated Aug. 4, 2016 from corresponding International PCT Application No. PCT/US16/29121, 3 pages.
Written Opinion dated Aug. 4, 2016 from corresponding International PCT Application No. PCT/US16/29121, 6 pages.
International Preliminary Report on Patentability dated Nov. 2, 2017 from corresponding International PCT Application No. PCT/US2016/029121, 8 pages.

* cited by examiner

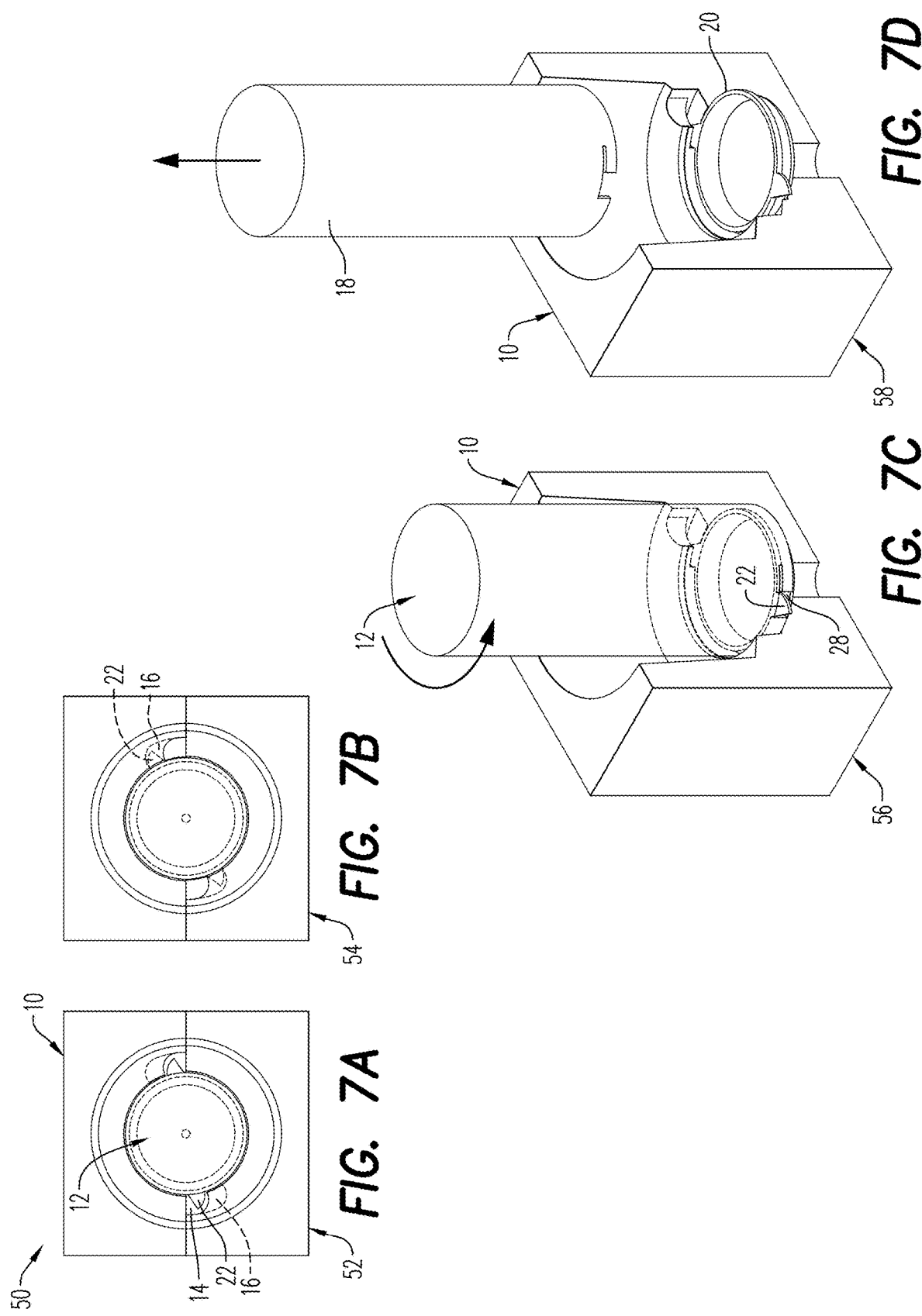

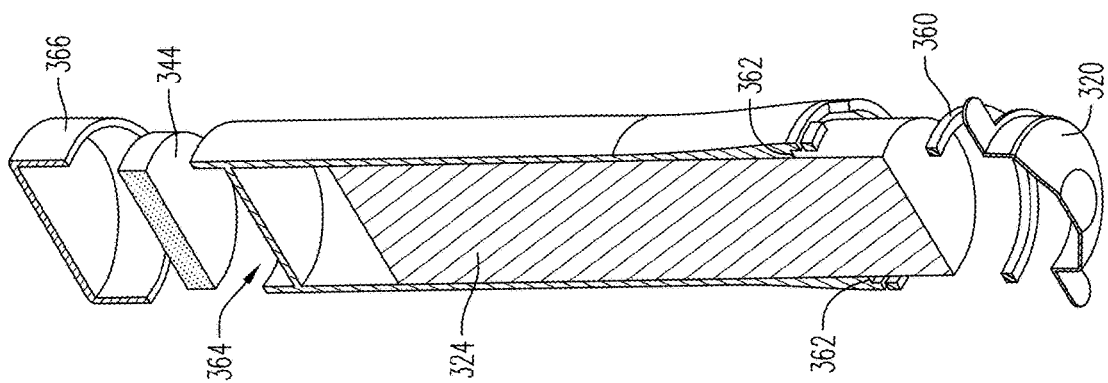
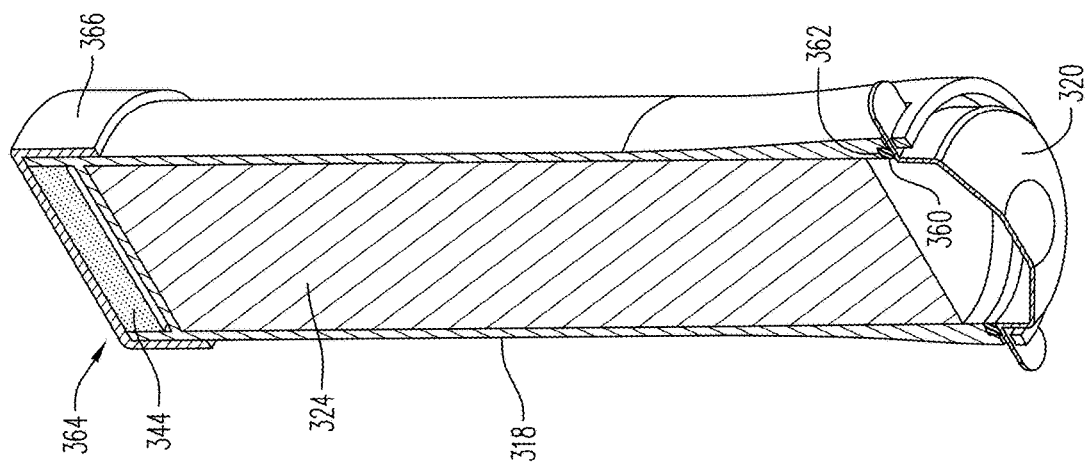
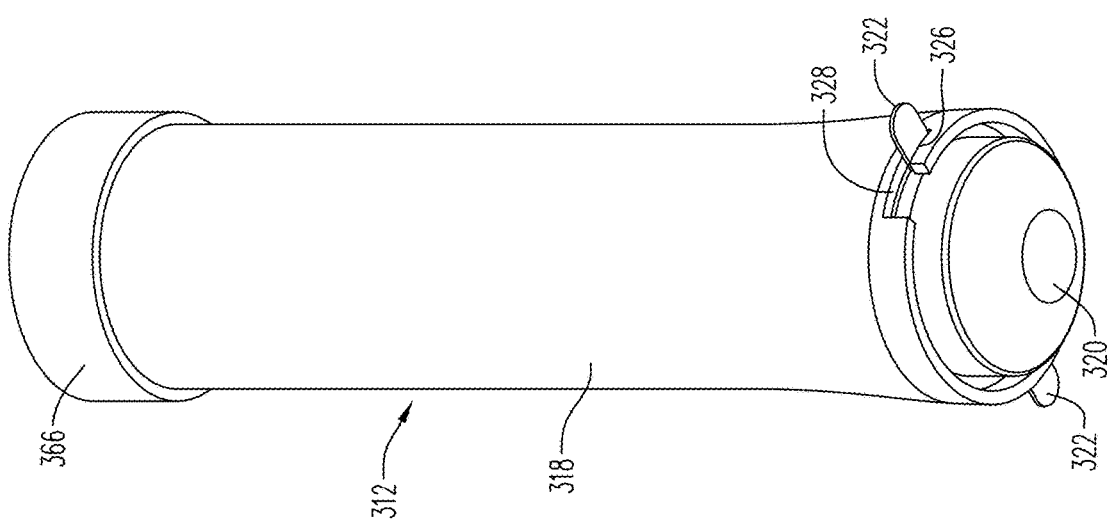

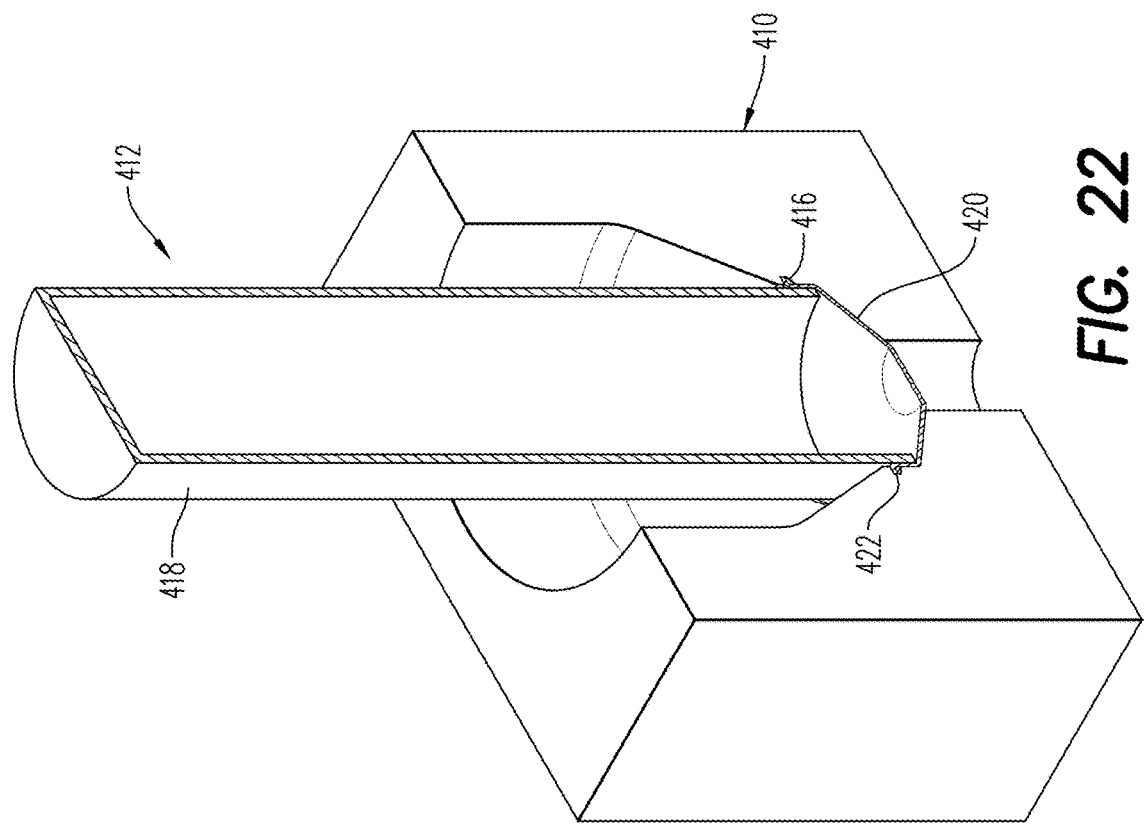
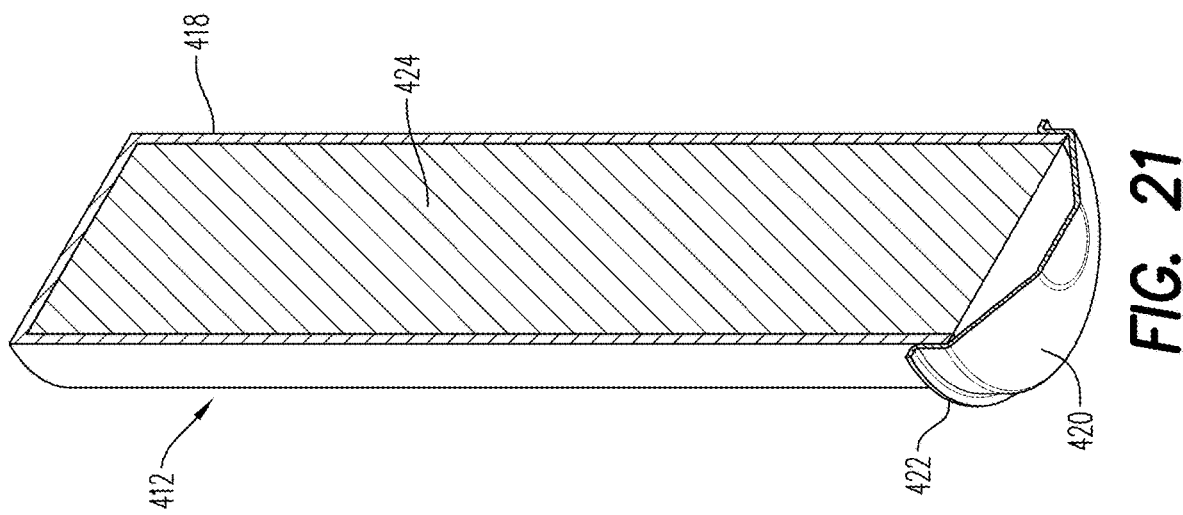

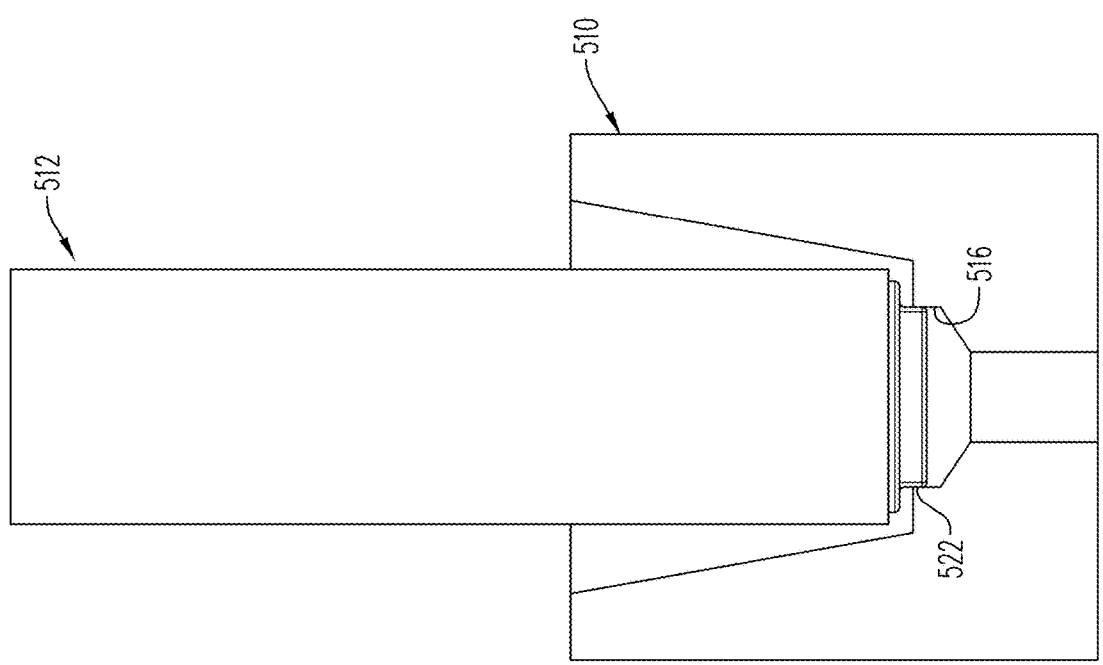

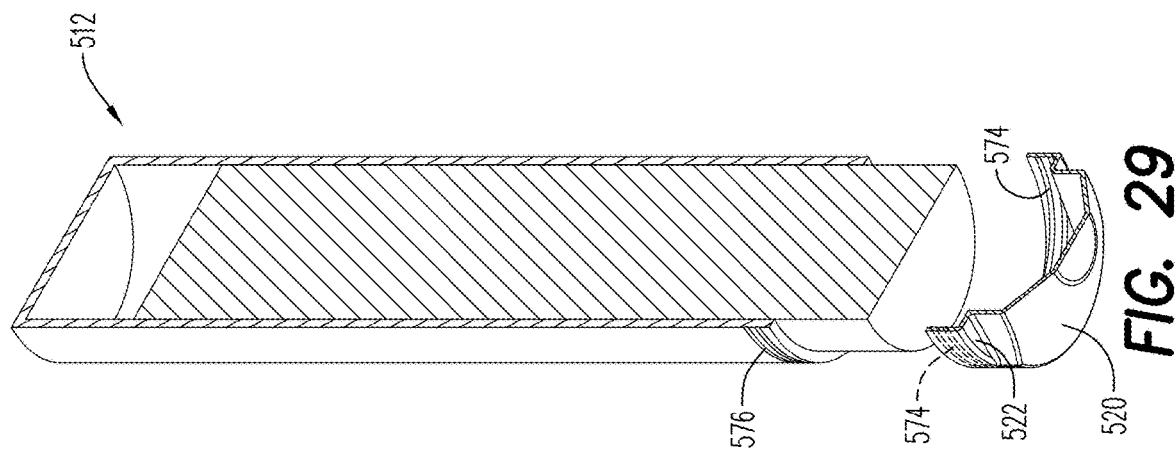
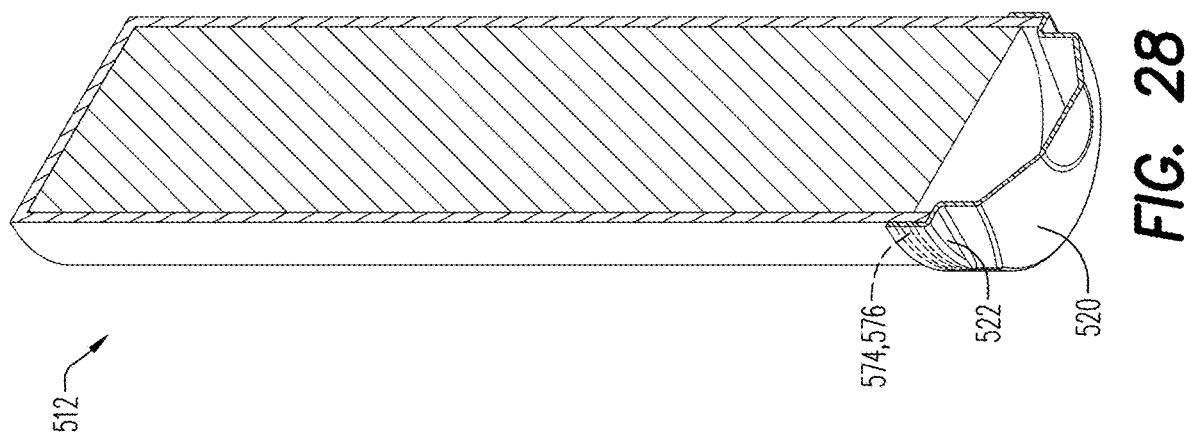

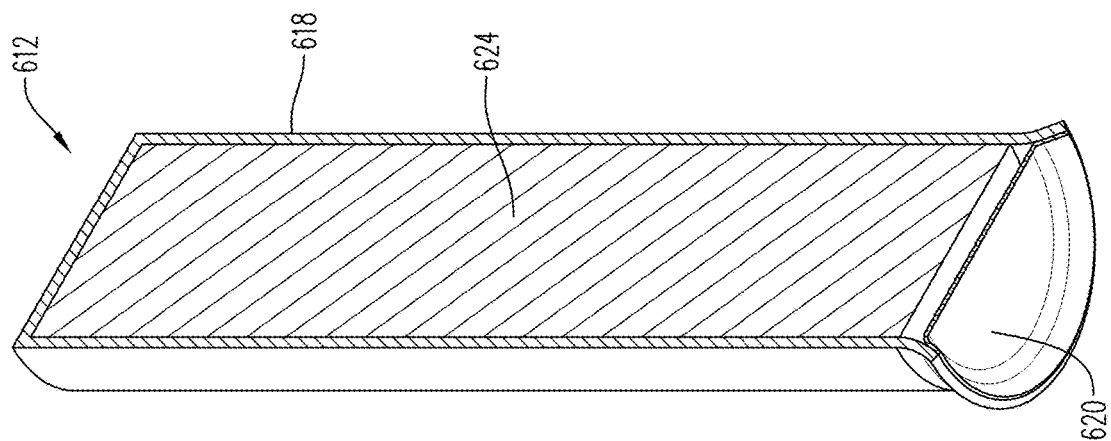
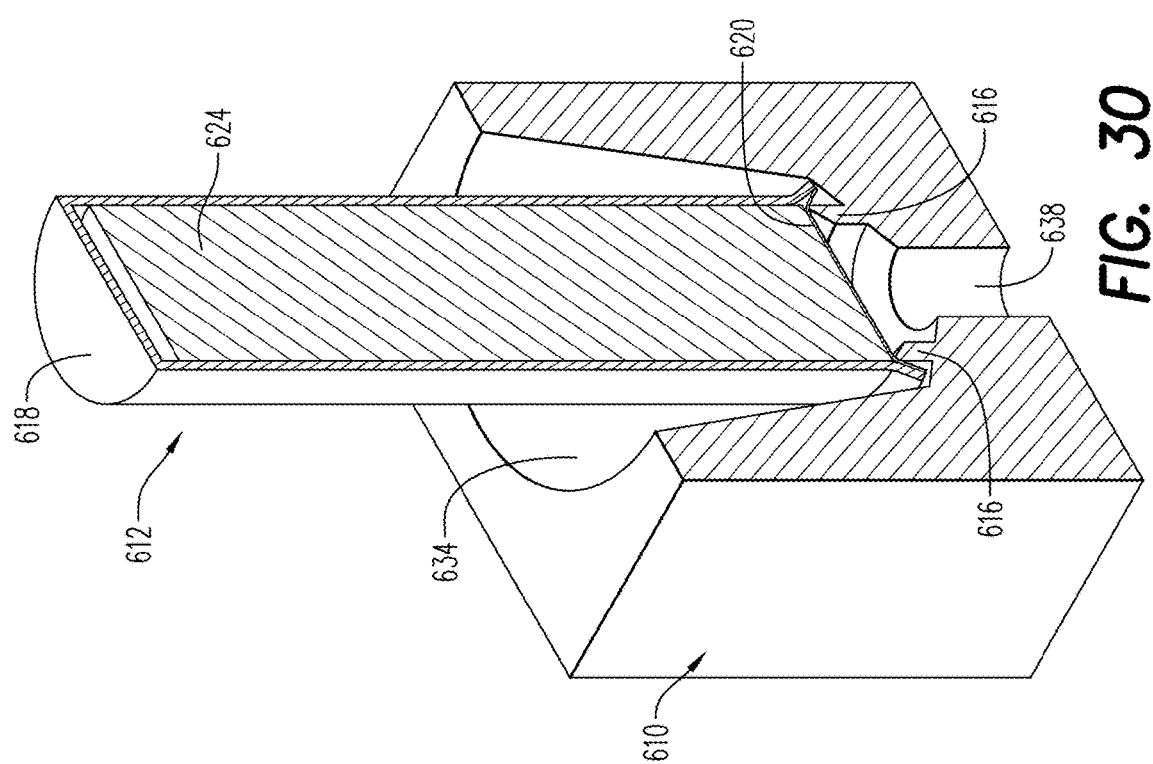

EXOTHERMIC REACTION WELDING MOLDS, WELD-METAL CONTAINING CARTRIDGES FOR SUCH MOLDS, AND METHODS OF USE

CROSS REFERENCE TO RELATED APPLICATIONS

This application is a divisional of U.S. application Ser. No. 16/269,025 filed Feb. 6, 2019, now pending, which is a divisional of U.S. application Ser. No. 15/137,247 filed on Apr. 25, 2016 and issued as U.S. Pat. No. 10,239,162 on Mar. 26, 2019, which claims the benefit of U.S. Provisional Application 62/152,651 filed on Apr. 24, 2015, the entire contents of all of which are incorporated herein by reference.

BACKGROUND

1. Field of the Disclosure

The present disclosure is related to exothermic welding. More particularly, the present disclosure is related to exothermic welding molds, weld-metal containing cartridges for such molds, and methods of use.

2. Description of Related Art

The use of exothermic reaction welding is known for joining various connectors and/or conductors to each other such as, but not limited to, stranded wire conductors, ground rods, connector lugs, and others.

During such welding, it is common to employ a reusable mold that has a reaction chamber in fluid communication with a weld cavity, which is positioned below the reaction chamber. In this process, portions of the components to be welded together are placed in the weld cavity—either before or after insertion of the weld materials. During insertion of the weld materials, a metal disk or plug is often placed at the bottom of the reaction chamber, to temporarily seal off the passageway between weld chamber from the reaction chamber, and an exothermic weld-metal is placed in the reaction chamber.

The weld-metal is ignited such that an exothermic reaction results in the reaction chamber. The weld-metal liquefies and melts the disk or plug to allow the molten material to flow into the weld cavity, which welds together the components within the cavity.

The process of installing the metal disk or plug and filling the reaction chamber with weld-metal occurs in the field and—often times—in difficult conditions, which can increase the time necessary to form the desired welds, can result in improper welds, and other disadvantageous results.

Thus, it has been determined by the present disclosure that there is a need for molds, weld-metal containing cartridges, and methods of use that overcome, alleviate, and/or mitigate one or more of the aforementioned and other deleterious effects of the prior art.

SUMMARY

Exothermic welding molds, weld-metal containing cartridges for such molds, and methods of use are provided. The mold, cartridges, and methods can provide interaction between the cartridge's disk member with the mold, which allows the housing member to be withdrawn from the mold while leaving the disk member and weld-metal in place.

In some embodiments, the interaction between the mold and the disk member is a rotational restraint alone, a vertical restraint alone, or combinations of rotational and vertical restraints.

In other embodiments, the interaction between the mold and the disk member is an outward pressure on the housing member and/or disk member, a shear force on the housing member and/or disk member, or combinations thereof.

In still other embodiments, the outward pressure on the housing member and/or disk member is provided without interaction between the disk member and the mold, but rather by the simple application of an internal pressure to the cartridge. The internal pressure can be applied by squeezing the walls of the cartridge and/or by depressing a pusher member.

The method includes dropping a weld-metal containing cartridge into a mold so that a protrusion of a disk member is received in an indentation of the mold; rotating the mold and cartridge with respect to one another so that the disk member is released from a housing member of the cartridge; and withdrawing the housing member from the mold so that disk member and the weld-metal within the cartridge remain in the mold.

An exothermic reaction welding mold is provided that includes a reaction chamber having a shoulder and a wall positioned above a passageway. The wall has at least one radially extending indentation defined therein. In some embodiments, the radially extending indentation further includes an undercut area.

An exothermic weld-metal containing cartridge is also provided that includes a housing member and a disk member. The housing member has a horizontal slot depending from a vertical slot. The disk member has a radially extending protrusion depending therefrom. The disk member is secured to the housing member with the radially extending protrusion in the horizontal slot. The disk member is removable from the housing member by rotation of the disk and housing members with respect to one another so that the extending protrusion is aligned with the vertical slot.

In some embodiments, the cartridge further includes exothermic weld-metal in the housing member. Additionally, the exothermic weld-metal can include an ignition material that is remote from the disk member.

In other embodiments, the housing member can include an upper retaining rim opposite the disk member and a pusher member slidably received in the housing member. The upper retaining rim prevents withdrawal of the pusher member from the housing member.

The housing member can also include a lower support rim to abut against and support the disk member.

A method of using exothermic reaction welding molds and cartridges is provided. The method includes dropping a weld-metal containing cartridge into a mold so that a protrusion of a disk member is received in an indentation of the mold; rotating the mold and cartridge with respect to one another so that the disk member is released from a housing member of the cartridge; and withdrawing the housing member from the mold so that disk member and the weld-metal within the cartridge remain in the mold.

In some embodiments, the rotating step includes rotating the mold and cartridge with respect to one another so that the protrusion is received in an undercut area of the mold and rotating the mold and housing member with respect to one another so that the disk member is released from the housing member.

In other embodiments, the withdrawing step includes pushing on a pusher member so that the pusher member slides in the housing member while withdrawing the housing member from the mold so that disk member and the weld-metal within the cartridge remain in the mold.

The above-described and other features and advantages of the present disclosure will be appreciated and understood by those skilled in the art from the following detailed description, drawings, and appended claims.

BRIEF DESCRIPTION OF THE DRAWINGS

FIGS. 7A-7D illustrate an exemplary embodiment of a method of using the mold of FIG. 1 with the cartridge of FIG. 3;

FIG. 13 is a bottom perspective view of an alternate exemplary embodiment of a weld-metal containing cartridge according to the present disclosure;

FIG. 14 is a sectional view of the cartridge of FIG. 13;

FIG. 15 is a partially disassembled view of the cartridge of FIG. 13;

FIG. 21 is a bottom perspective sectional view of an alternate exemplary embodiment of a weld-metal containing cartridge according to the present disclosure;

FIG. 22 is a top perspective sectional view of the cartridge of FIG. 21 in use with another exemplary embodiment of an exothermic reaction welding mold according to the present disclosure;

FIG. 27 is a sectional view of the cartridge of FIG. 25 in use with another exemplary embodiment of an exothermic reaction welding mold according to the present disclosure;

FIG. 28 is a bottom perspective sectional view of an alternate exemplary embodiment of a weld-metal containing cartridge according to the present disclosure;

FIG. 29 is a partially disassembled view of the cartridge of FIG. 28;

FIG. 30 is a top perspective sectional view of an alternate exemplary embodiment of a weld-metal containing cartridge according to the present disclosure in use with another exemplary embodiment of an exothermic reaction welding mold according to the present disclosure;

FIG. 31 is a bottom perspective sectional view of the cartridge of FIG. 30;

DESCRIPTION

Generally, the exothermic welding molds, weld-metal containing cartridges for such molds, and methods of use are provided. The mold, cartridges, and methods can provide interaction between the cartridge's disk member with the mold, which allows the housing member to be withdrawn from the mold while leaving the disk member and weld-metal in place.

In the embodiments of FIGS. 1-7D, 13-18, and 19-20, respectively, the interaction between the mold and the disk member is a combination of both a rotational restraint and a vertical restraint alone.

In the embodiments of FIGS. 8-12D, 25-27, and 28-29, respectively, the interaction between the mold and the disk member is a rotational restraint only.

In the embodiment of FIGS. 21-24, the interaction between the mold and the disk member is a vertical restraint only.

In the embodiment of FIGS. 30-31, the interaction between the mold and the disk member provides an outward pressure on the housing member and/or disk member, a shear force on the housing member and/or disk member, or combinations thereof.

Contrary to the embodiments of FIGS. 1-31 that provide interaction between the mold and the disk member, the embodiments of FIGS. 32-37 require no such interaction.

Rather in the embodiments of FIGS. 32-37, the weld-metal containing cartridges are configured so that outward pressure on the housing member and/or disk member is applied by a simple application of an internal pressure to the cartridge. The internal pressure can be applied by squeezing the walls of the cartridge as in the embodiments FIGS. 32-33, 34, and 35, respectively, and/or by depressing a pusher member as in the embodiment of FIGS. 36-37.

DETAILED DESCRIPTION

Figure 2A:
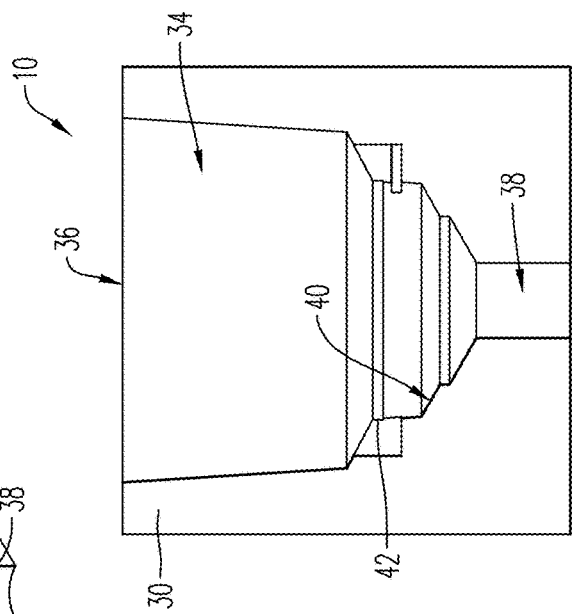
FIG. 2A is top perspective view of the mold of FIG. 1 taken along lines 2-2.
Figure 2B:
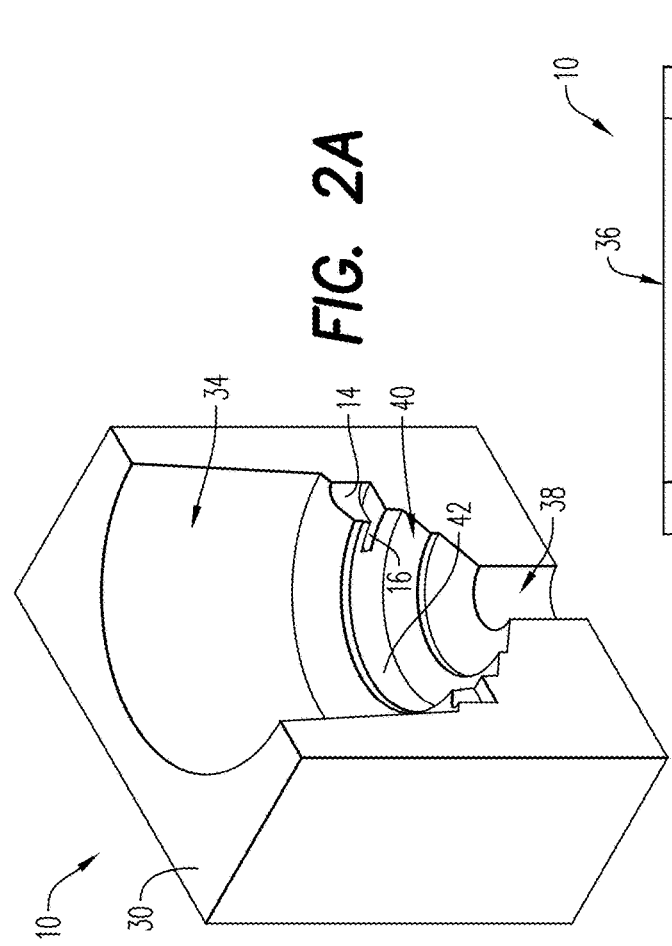
FIG. 2B is side view of the mold of FIG. 1 taken along lines 2-2.
Figure 1:
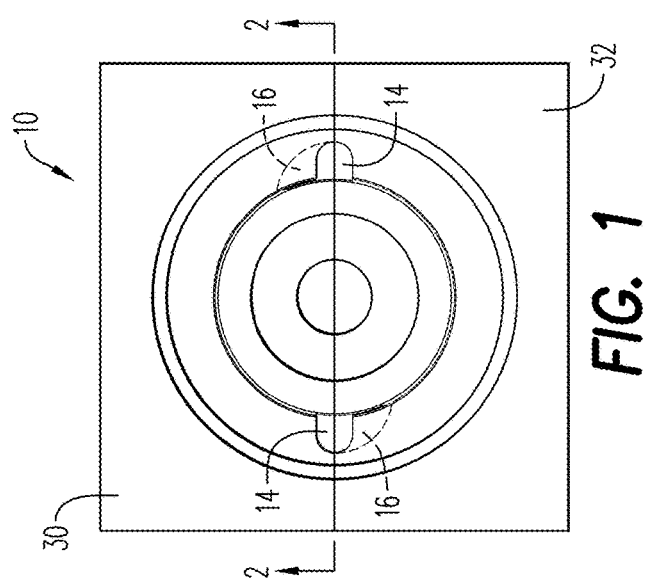
FIG. 1 is top view of an exemplary embodiment of an exothermic reaction welding mold according to the present disclosure.
Figure 6:
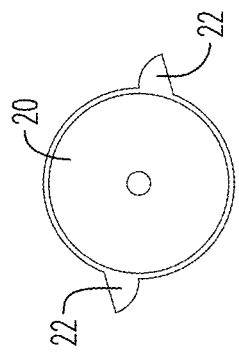
FIG. 6 is a top view of a removable disk member of the cartridge of FIG. 3.
Figure 5:
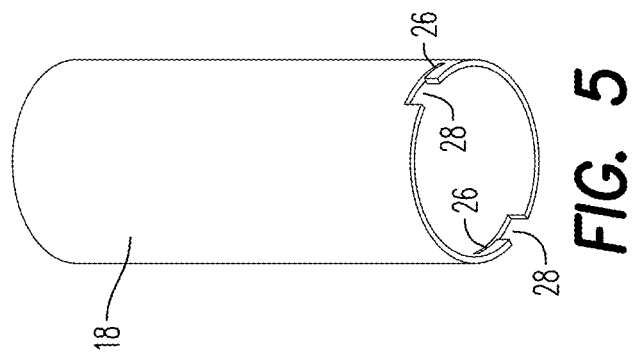
FIG. 5 is a bottom perspective view of a housing member of the cartridge of FIG. 3.
Figure 4:
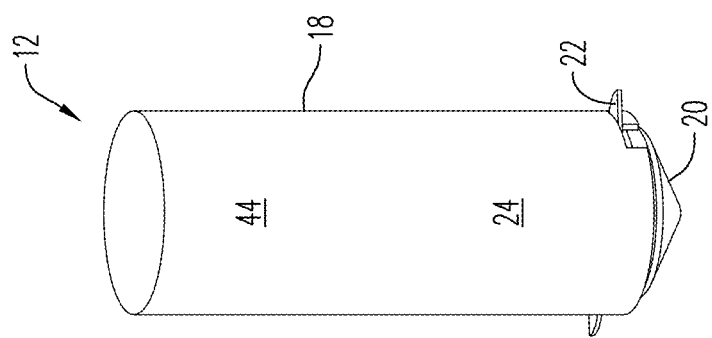
FIG. 4 is a side perspective view of the cartridge of FIG. 3.
Figure 3:
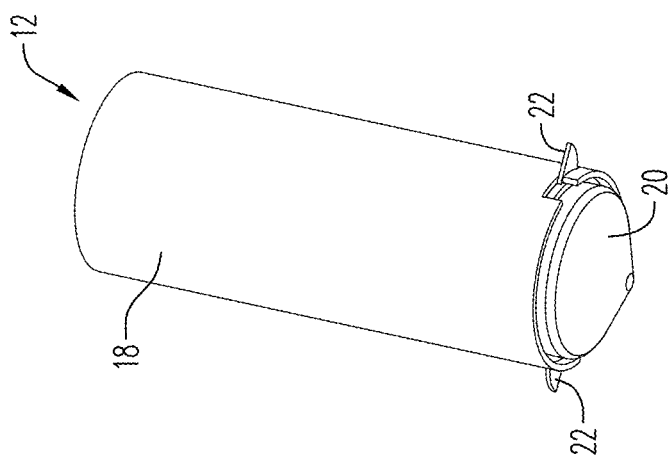
FIG. 3 is a bottom perspective view of an exemplary embodiment of a weld-metal containing cartridge for use with the mold of FIG. 1.
Figure 9B:
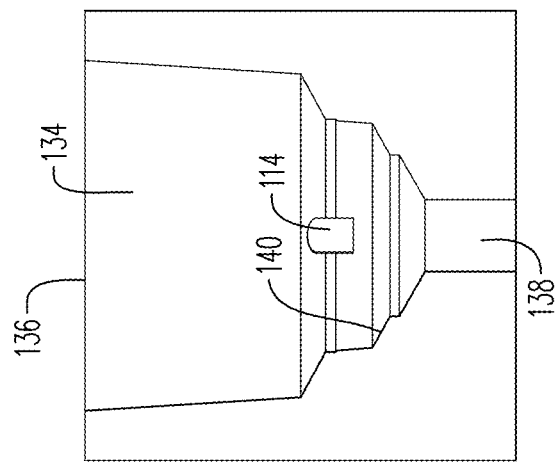
FIG. 9B is side view of the mold of FIG. 8 taken along lines 9-9.
Figure 9A:
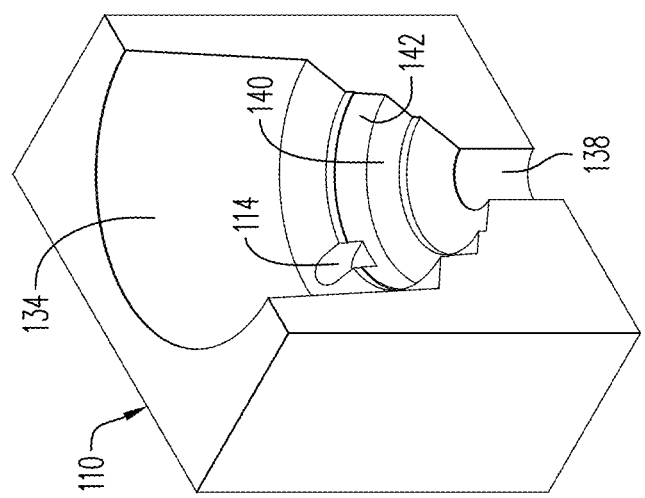
FIG. 9A is top perspective view of the mold of FIG. 8 taken along lines 9-9.
Figure 8:
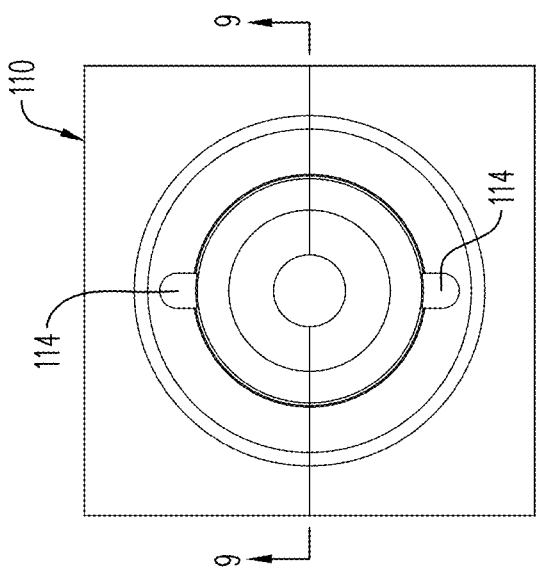
FIG. 8 is top view of an alternate exemplary embodiment of an exothermic reaction welding mold according to the present disclosure.
Figure 11:
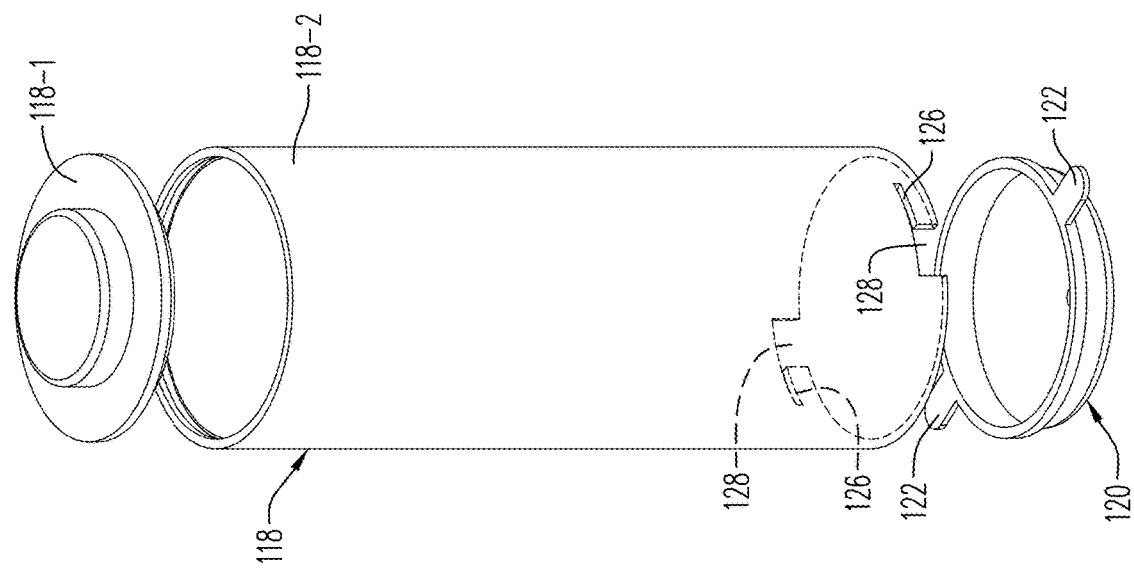
FIG. 11 is a disassembled perspective view of the cartridge of FIG. 10.
Figure 10:
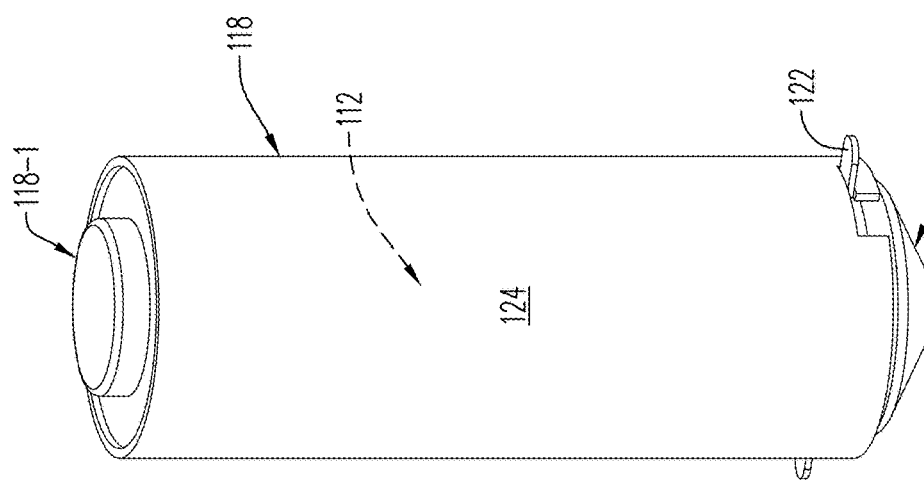
FIG. 10 is a perspective view of an alternate exemplary embodiment of a weld-metal containing cartridge for use with the mold of FIG. 8.
Figure 12B:
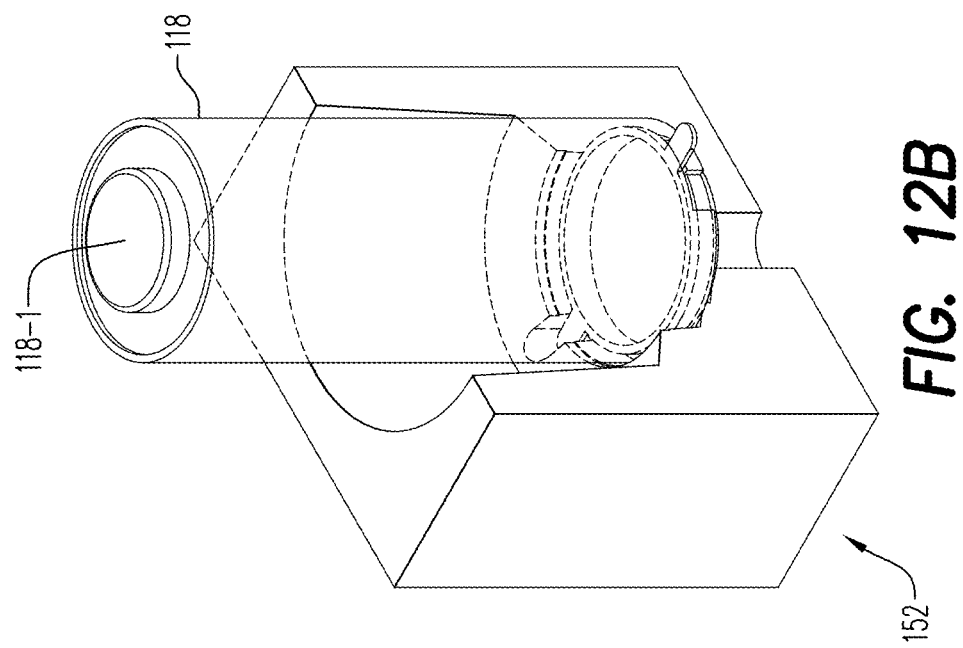
FIGS. 12A-12D illustrate an exemplary embodiment of a method of using the mold of FIG. 8 with the cartridge of FIG. 10.
Figure 12A:
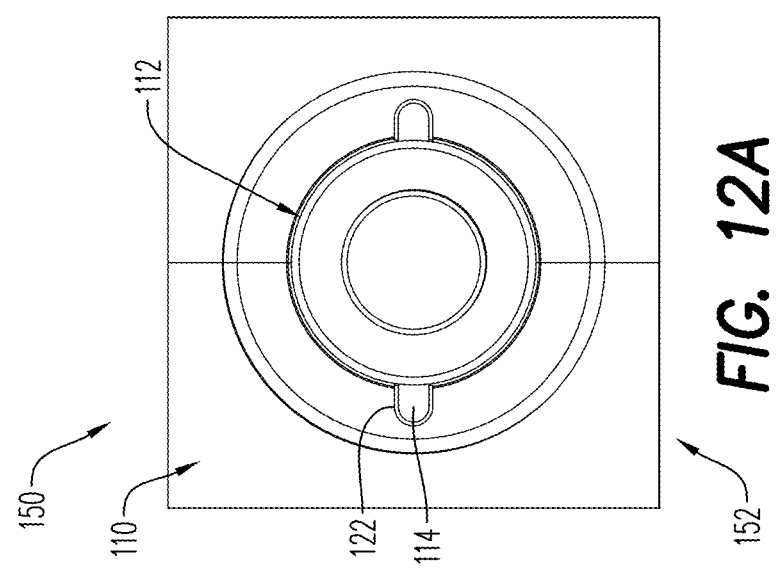
Figure 12D:
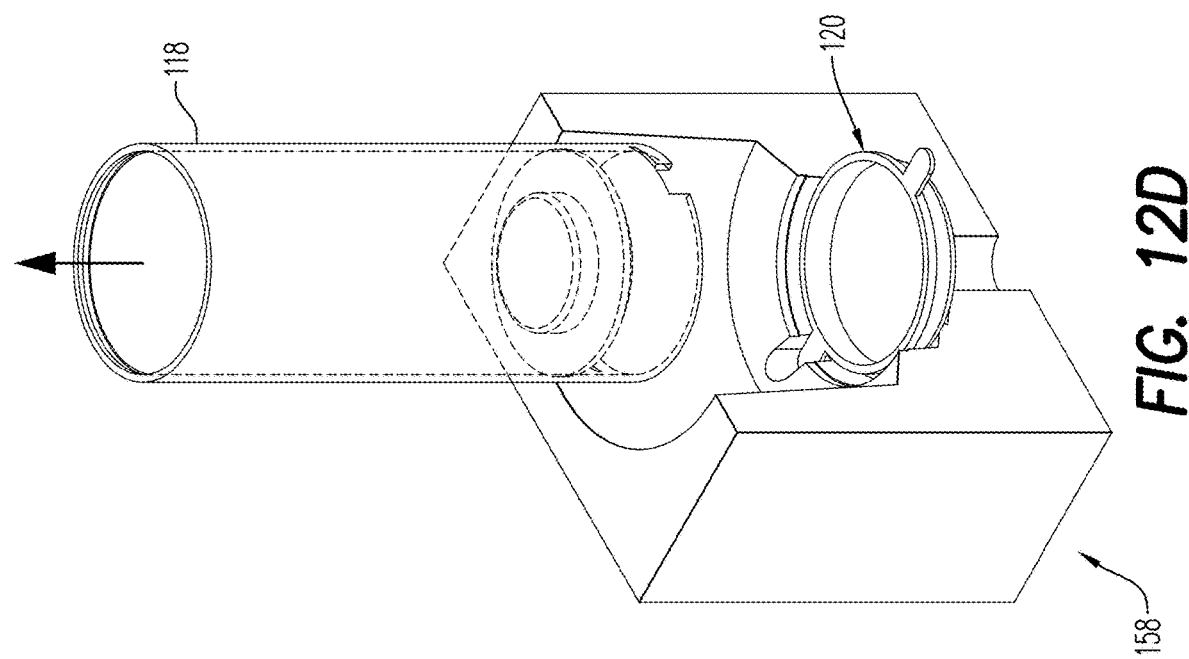
Figure 12C:
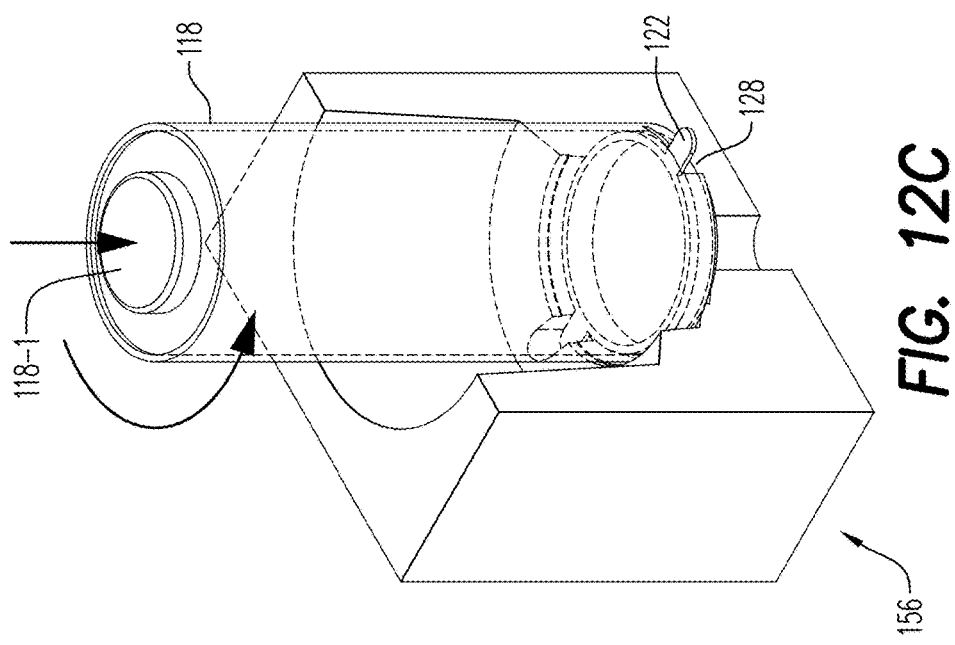

Referring to the drawings and in particular to FIGS. 1, 2A, and 2B, an exemplary embodiment of an exothermic reaction welding mold according is shown and is generally referred to by reference numeral 10. Additionally, an exemplary embodiment of a weld-metal containing cartridge for use with the mold of FIG. 1 is shown and is generally referred to by reference numeral 12 is shown in FIGS. 3-6.

Mold 10 and cartridge 12 are described in detail below with simultaneous reference to FIGS. 1-6. Generally, mold 10 includes one or more radially extending indentations 14 and one or more undercut areas 16 (two shown of each). Cartridge 12 includes a housing member 18 and a removable disk member 20, which includes one or more radially extending protrusions 22 depending therefrom.

Cartridge 12 can be filled with exothermic weld-metal 24 of any composition sufficient to weld desired components to one another. In some embodiments, weld-metal 24 is in powdered form. Of course, it is contemplated by the present disclosure for weld-metal 24 to have any desired form such as, but not limited to, a single solid form, multiple solid portions, and combinations of solid and powdered portions.

Advantageously, indentations 14 are configured to receive protrusions 22 of cartridge 12 when the cartridge is placed into mold 10. Then, upon rotation of mold 10 and cartridge 12 with respect to one another, undercut areas 16 are configured to receive and engage protrusions 22.

Cartridge 12 includes horizontal slots 26 and vertical slots 28. Disk member 20 is received in an inner dimension of housing member 18 with protrusions 22 received in horizontal slots 26. In this position, disk member 20 is removably secured to housing member 18 by protrusions 22 with the protrusions acting in a manner similar to bayonet-type connections.

Once protrusions 22 are engaged in areas 16, further rotation of cartridge 12 releases housing member 18 from disk member 20 by rotating the disk member with respect to the housing member until the protrusions are free of horizontal slots 26 and are aligned with vertical slots 28. After protrusions 22 are aligned with vertical slots 28, housing member 18 can be withdrawn from mold 10 with disk member 20 being retained in position in the mold 10.

It should be recognized that cartridge 12 is described above by way of example as having disk member 20 in an inner dimension of housing member 18 so that protrusions 22 serve two functions, namely removably securing the disk member to the housing member and extending outward from the cartridge for receipt in and engagement with indentations 14 and undercut areas 16, respectively. Of course, it is contemplated by the present disclosure for disk member 20 to be secured to an outer dimension of housing member 18 via a first connection (not shown) such as a threaded or other rotation releasable connection in a manner that allows protrusions 22 to serve only a single functions, namely removably securing the disk member to the housing member and extending outward from the cartridge for receipt in and engagement with indentations 14 and undercut areas 16, respectively.

As housing member 18 is withdrawn from mold 10, weld-metal 24 is released from the housing member and remains on disk member 20 in the desired position within mold 10. Thus, mold 10 and cartridge 12 are configured so that protrusions 22 of disk member 20 are retained both rotationally and vertically in the mold, allowing easy withdrawal of housing member 18.

Simply stated, mold 10 and cartridge 12 provide a system to install and secure disk 20 in the desired position in the mold and fill the mold with weld-metal 24 in a simple and repeatable manner. Additionally, cartridge 12 can prevent or at least mitigate exposure of weld-metal 24 to moisture before use.

Returning again to FIGS. 1, 2A, and 2B, mold 10 includes a first portion 30 and a second portion 32 that, when positioned adjacent one another define a reaction chamber 34 having an open top 36 and a passageway 38 that leads to a weld chamber (not shown). First and second portions 30, 32 are then held in the desired position in any desired method such as using clamps known in the art.

It should be recognized that first and second portions 30, 32 are illustrated for ease of description as being symmetrical mirror images of one another. Of course, it is contemplated by the present disclosure for portions 30, 32 to have any desired configuration. Thus in the illustrated embodiment, the part line between first and second portions 30, 32 is positioned so that a portion of indentations 14 are present in each portion, while one undercut area 16 is in present in only one portion and the other undercut area 16 is in present in only the other portion.

Reaction chamber 34 has a shoulder 40 that receives disk member 20 and a wall 42 depending from the shoulder. In the illustrated embodiment, indentation 14 and undercut area 16 are positioned in wall 42 so that protrusions 22 are received in the indentations and can be received in the undercut areas when disk member 20 is received on shoulder 40.

Thus, mold 10 and cartridge 12 are illustrated having disk 20 and shoulder 40 with corresponding shapes. In the illustrated embodiment, disk 20 has a tapered bottom surface with an angle of about 120 degrees, while shoulder 40 has a tapered upper surface with an angle of about 120 degrees. Of course, it is contemplated by the present disclosure for disk 20 and shoulder 40 to have any desired corresponding or non-corresponding shape.

Mold 10 and more specifically first and second portions 30, 32 are, in some embodiments formed from graphite. Cartridge 12, in some embodiments, includes housing member 18 formed of materials such as, but not limited to, polymers including thermoplastic and thermoset polymers, fibers materials, paper or paper composites, ceramic, porcelain, graphite, metals including aluminum or aluminum alloys, and any other material having the desired oxygen and/or moisture protection properties, while disk member 20 is formed from metal such, as but not limited to, steel, copper, aluminum, and others.

In some embodiments, cartridge 12 can include one or more identifying indicia that allow the user to visually identify one or more attributes of the cartridge such as, but not limited to, catalog number, product number, the cartridge size, mold type, weld-material type, serial number, barcode, and others. The identifying indicia can include a color of housing member 18 and/or disk member 20, a label on the and/or disk member, and other indicia.

Disk member 20 is sufficient to temporarily seal off passageway 38 between reaction chamber 34 and the weld chamber to allow weld-metal 24, once ignited in the reaction chamber, to reach a desired temperature and/or reaction state before melting through the disk member and passing, under the effect of gravity, through the passageway into the weld chamber.

In some embodiments, weld-metal 24 includes an ignition material 44. During assembly of cartridge 12, ignition material 44 is, preferably placed into housing member 18 before weld-metal 24 so that the ignition material is remote or opposite disk member 20. In this manner, ignition material 44—after removal of housing member 18—is accessible to the user through open top 36 of mold 10.

It should be recognized that cartridge 12 and mold 10 can have any desired number of protrusions 22 and indentations 14/undercut areas 16 sufficient to retain (rotationally and vertically) disk member 20 in the mold. Moreover, it should be recognized that cartridge 12 and mold 10 are described by way of example as having protrusions 22 on disk member 20 and indentations 14 on the mold. Of course, it is contemplated by the present disclosure for mold 14 to have protrusions and disk member 20 to have indentions sufficient to retain (rotationally and vertically) disk member 20 in the mold.

Referring now to FIGS. 7A-7D, a method of using mold 10 and cartridge 12 is described and is generally referred to by reference numeral 50.

Method 50 includes a first or drop-in step 52 where cartridge 12 is inserted vertically through open top 36 of mold 10. During drop-in step 52, cartridge 12 is placed in mold 10 so that protrusions 22 are received in indentations 14, the bottom surface of disk member 20 is supported by shoulder 40 of the mold, and the disk member covers passageway 38 at the bottom of reaction chamber 34.

Method 50 further includes a second or protrusion-locking step 54 where protrusions 22 are locked to mold 10. During protrusion-locking step 54, cartridge 12 is rotated with respect to mold 10 until protrusions 22 are received in undercut areas 16 of the mold.

It should be recognized that protrusion-locking step 54 is described by way of example only as rotating cartridge 12 with respect to mold 10. Of course, it is contemplated by the present disclosure for step 54 to include any rotation of mold 10 and cartridge 12 with respect to one another.

The rotation of cartridge 12 with respect to mold 10 is continued in step 54 until contact and/or the friction between protrusions 22 and undercut areas 16 is greater than the friction between the protrusions and horizontal slots 26 in housing member 18. At this point, method 50 includes a third or disk-removal step 56.

During disk-removal step 56, cartridge 12 is rotated—with protrusions 22 held in place by undercut areas 16, so that the protrusions slide within horizontal slots 26 until the protrusions are aligned with vertical slots 28.

Simply stated, protrusion-locking step 54 and disk-unlocking step 56 serve to secure disk member 20 in mold 10 and to unlock or free the disk member from housing member 18.

Method 50 further includes a fourth or housing-removal step 58. During housing-removal step 58, housing member 18 is lifted from mold 10 such that protrusions 22 slide vertically through slots 28 of the housing member—leaving disk member 20 in place in the mold and allowing weld-metal 24 to release and/or flow from the housing member into reaction cavity 34.

In embodiments where cartridge 12 weld-metal 24 includes ignition material 44, the ignition material—after removal of housing member 18 during step 58—is accessible to the user through open top 36 of mold 10.

Alternate exemplary embodiments of an exothermic reaction welding mold 110, a weld-metal containing cartridge 112, and method 150 according to the present disclosure are described with simultaneous reference to FIGS. 8, 9A-9B, 10-11, and 12A-12D. Here, component parts performing similar and/or analogous functions to those discussed above are labeled in multiples of one hundred and various elements that may or may have not been changed have been omitted for purposes of brevity.

Mold 110 and cartridge 112, much like mold 10 and cartridge 12 discussed above, include one or more radially extending indentations 114 and a housing member 118 and a removable disk member 120, which includes one or more radially extending protrusions 122 depending therefrom. However, mold 110 lacks the undercut areas 16 discussed above with respect to mold 10.

Indentations 114 are configured to receive protrusions 122 of cartridge 112 when the cartridge is placed into mold 110. Then, upon rotation of mold 110 and cartridge 112 with respect to one another, indentations 114 engage protrusions 122 to prevent rotation of disk member 120 with respect to housing member 118.

Cartridge 112 includes horizontal slots 126 and vertical slots 128. Disk member 120 is received in an inner dimension of housing member 118 with protrusions 122 received in horizontal slots 126. In this position, disk member 120 is removably secured to housing member 118 by protrusions 122 with the protrusions acting in a manner similar to bayonet-type connections.

Once protrusions 122 are received in indentations 114, rotation of cartridge 112 releases housing member 118 from disk member 120 by rotating the disk member with respect to the housing member until the protrusions are free of horizontal slots 126 and are aligned with vertical slots 128. After protrusions 122 are aligned with vertical slots 128, housing member 118 can be withdrawn from mold 110.

Thus, mold 110 and cartridge 112 are configured so that protrusions 122 of disk member 120 are retained rotationally in the mold, allowing easy release of the disk member from the housing member. However since disk member 120 is not retained with respect to vertical movement in mold 110, cartridge 112 further includes a pusher member 118-1 for weld-metal 124 within housing member 118.

Pusher member 118-1 is slidably positioned in housing member 118 in a position opposite disk member 120. Once protrusions 122 of disk member 120 has been released from horizontal slot 126 and are aligned with vertical slot 128, downward pressure on pusher member 118-1 can be used to push weld-metal 124 from the housing member will keeping the disk member in place in mold 110.

In some embodiments, housing member 118 can include an upper retaining ring 118-2 to preview inadvertent withdrawal of pusher member 118-1 from the upper edge. Rather, retaining ring 118-2 can ensure that pusher member 118-1 can only be slid within housing member 118 towards disk member 120 after protrusions 122 of the disk member have been aligned with vertical slots 128.

In this manner and similar to the embodiment discussed above, as housing member 118 is withdrawn from mold 110 and pressure is applied to pusher member 118-1, weld-metal 124 is released from the housing member and remains on disk member 120 in the desired position within mold 110.

It should be recognized that cartridge 112 is described above by way of example as having disk member 120 in an inner dimension of housing member 118 so that protrusions 122 serve two functions, namely removably securing the disk member to the housing member and extending outward from the cartridge for receipt in indentations 114. Of course, it is contemplated by the present disclosure for disk member 120 to be secured to an outer dimension of housing member 118 via a first connection (not shown) such as a threaded or other rotation releaseable connection in a manner that allows protrusions 122 to serve only a single function, namely removably securing the disk member to the housing member and extending outward from the cartridge for receipt in indentations 114.

Referring now to FIGS. 12A-12D, a method of using mold 110 and cartridge 112 is described and is generally referred to by reference numeral 150.

Method 150 includes a first or drop-in step 152 where cartridge 112 is inserted vertically through open top 136 of mold 110. During drop-in step 152, cartridge 112 is placed in mold 110 so that protrusions 122 are received in indentations 114, the bottom surface of disk member 120 is supported by shoulder 140 of the mold, and the disk member covers passageway 138 at the bottom of reaction chamber 134.

In the illustrated embodiment, indentations 114 positioned in wall 142 so that protrusions 122 are received in the indentations when disk member 120 is received on shoulder 140.

Method 150 lacks the second or protrusion-locking step 54 discussed above. Rather, method 150 merely includes a third or disk-removal step 156 in which cartridge 112 is rotated—with protrusions 122 held in place by indentations 114, so that the protrusions slide within horizontal slots 126 until the protrusions are aligned with vertical slots 128. In this manner, disk-unlocking step 156 serves to unlock or free disk member 120 from housing member 118.

Method 150 further includes a fourth or housing-removal step 158. During housing-removal step 158, housing member 118 is lifted from mold 110 while downward pressure is applied to pusher member 118-1 such that protrusions 122 slide vertically through slots 128 of the housing member—leaving disk member 120 in place in the mold and allowing weld-metal 124 to be pushed from and/or flow from the housing member into reaction cavity 134.

Alternate exemplary embodiments of a weld-metal containing cartridge 312 and an exothermic reaction welding mold 310 according to the present disclosure are described with simultaneous reference to FIGS. 13-18. Component parts performing similar and/or analogous functions to those discussed above are labeled in multiples of three hundred and various elements that may or may have not been changed have been omitted for purposes of brevity.

Cartridge 312 includes housing member 318 and disk member 320 with weld-metal 324 therein. Housing and disk member are removably connected to one another by way of protrusions 322, horizontal slots 326, and vertical slots 328 in a manner similar to that disclosed above with respect to FIGS. 3-6.

Cartridge 312 further includes a seal 360 that is secured to a rim 362 of housing member 318. Seal 360 is, for example, an o-ring or other sealing member that, when housing and disk members 318, 320 are connected to one another forms a seal between the disk member and rim 362. In some embodiments, seal 360 forms a hermetic seal that prevents the egress of water and moisture into weld-metal 324.

Figure 17:
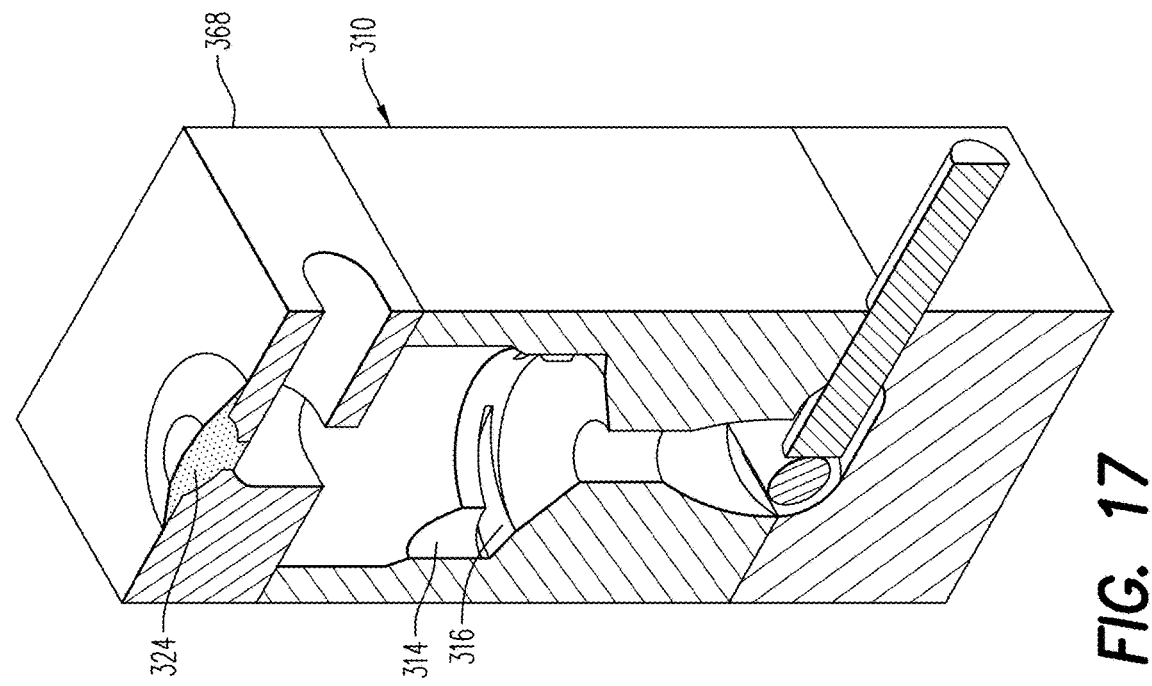
FIG. 17 is a sectional view of the mold of FIG. 16 after removal of the cartridge.
Figure 16:
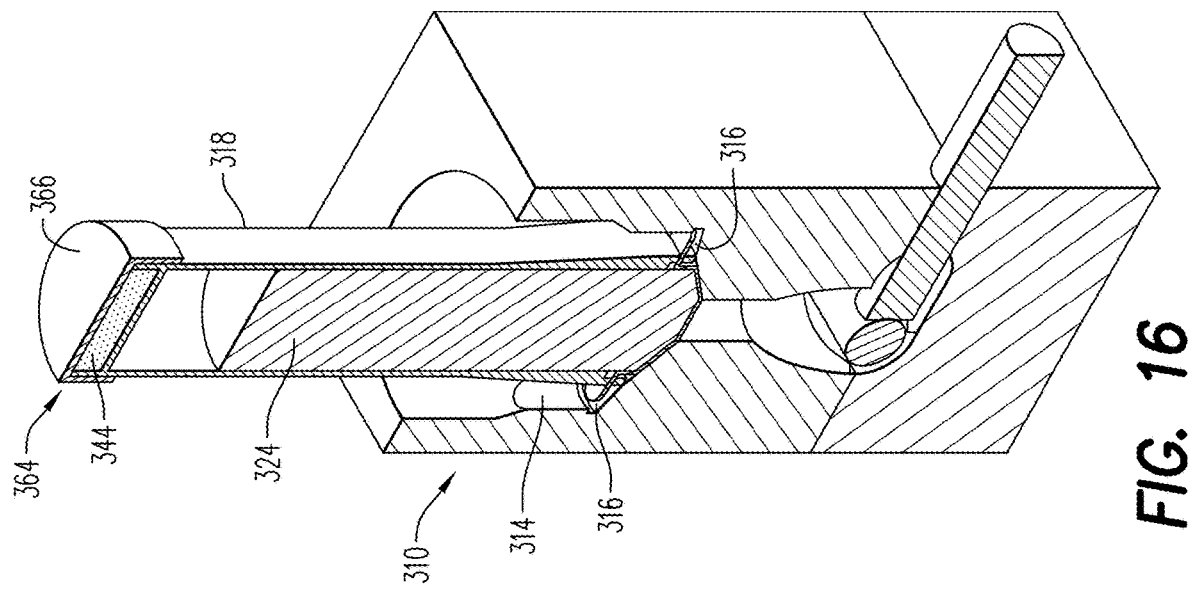
FIG. 16 is a sectional view of the cartridge of FIG. 13 in use with another exemplary embodiment of an exothermic reaction welding mold according to the present disclosure.

Additionally, cartridge 312 includes a separate area 364 opposite disk member 320, where the separate area is sufficient to store an ignition material 344 separate from weld-metal 324. Preferably, separate area 364 is sealed before use by a removable cap 366. In this manner, cartridge 318 is configured so that after providing weld-metal 324 into mold 310, ignition material 344 can be provided either onto the weld metal (not shown) or, alternately onto mold lid 368 as shown in FIG. 17.

Figure 18:
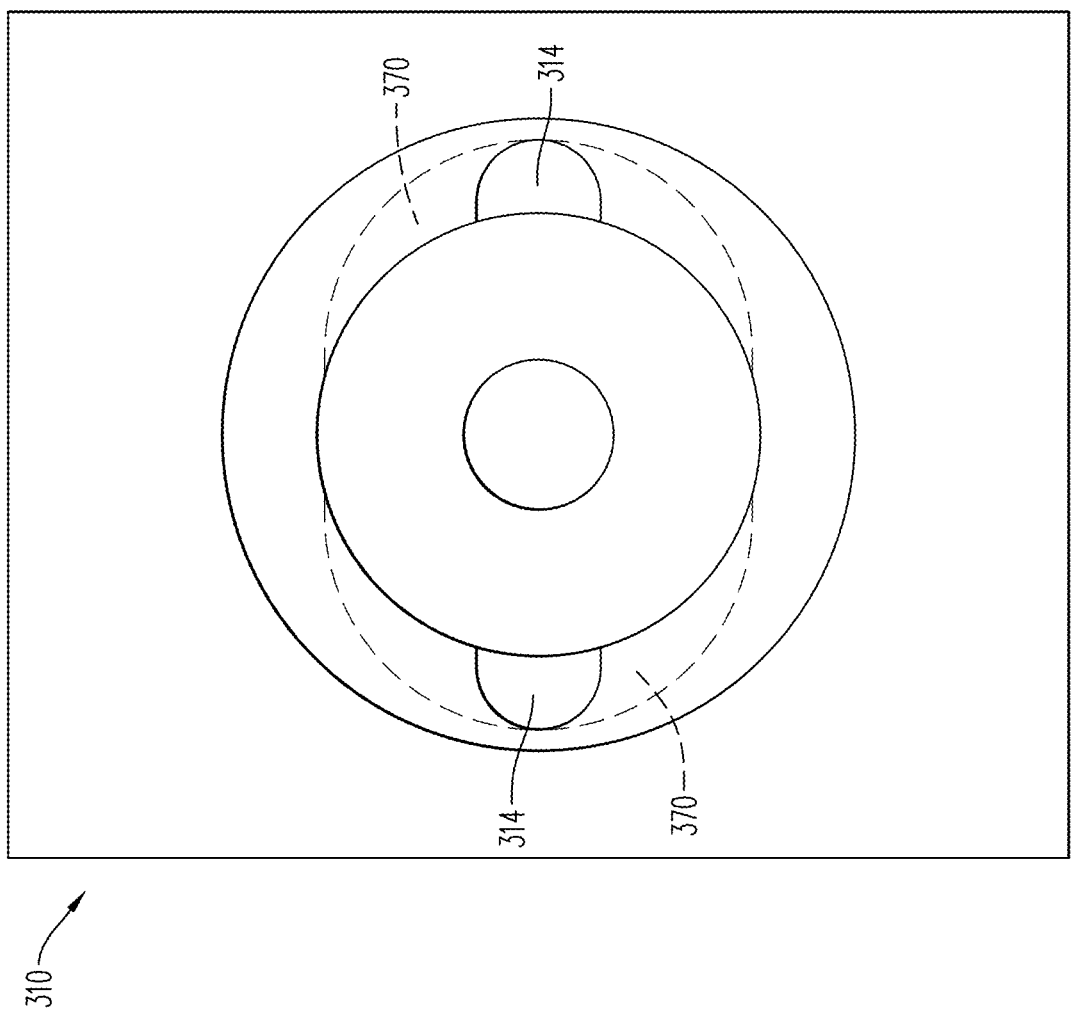
FIG. 18 is a top view of the mold of FIG. 16.

Mold 310 includes indentations 314 and undercut areas 316 that receive protrusions 322 of disk member 320 in a manner similar to that disclosed above with respect to FIGS. 3-6. Here, undercut areas 316 have a preferably rotational area 370 as shown in FIG. 18. Without wishing to be bound by any particular theory, undercut areas 316 with rotational area 370 provides increased clearance with the mold 310, which can assist the user during cleaning of slag and/or unused weldament between uses.

Further, the rotational shape of areas 370 have been found by the present disclosure to ease in manufacture of mold 310 by allowing the areas to be easily undercut into the mold using a circular cutting blade (not shown).

Figure 20:
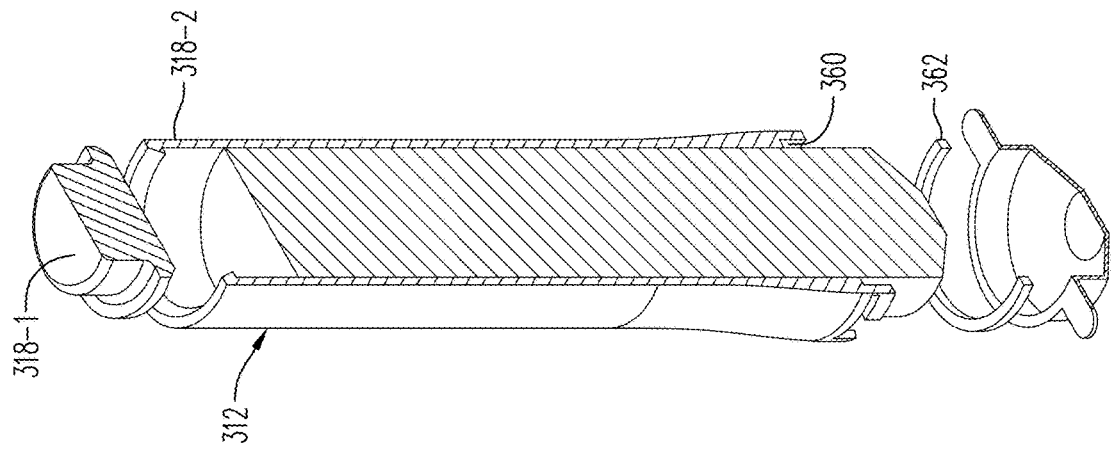
FIG. 20 is a partially disassembled view of the cartridge of FIG. 19.
Figure 19:
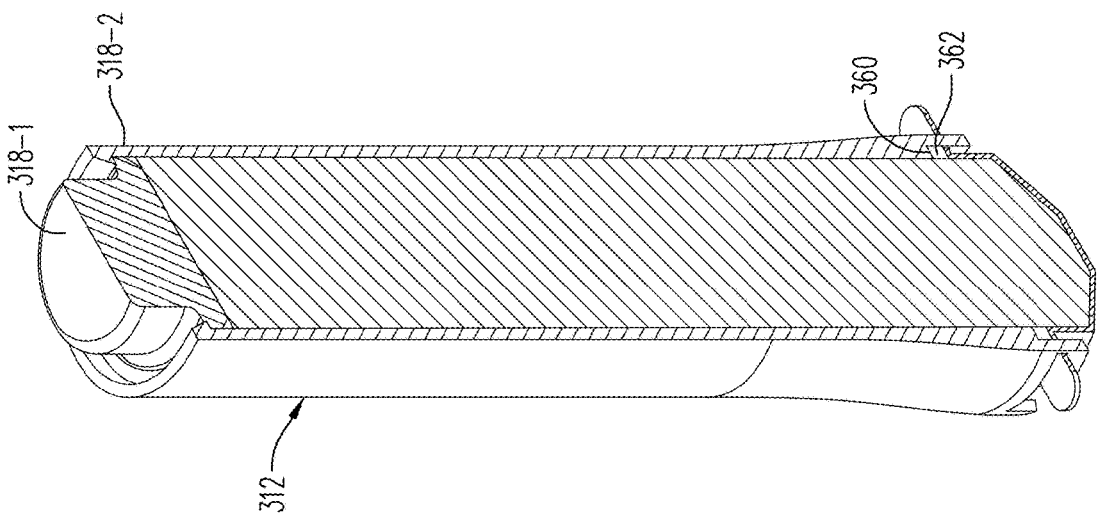
FIG. 19 is a top perspective sectional view of an alternate exemplary embodiment of the cartridge of FIG. 13.
Figure 24:
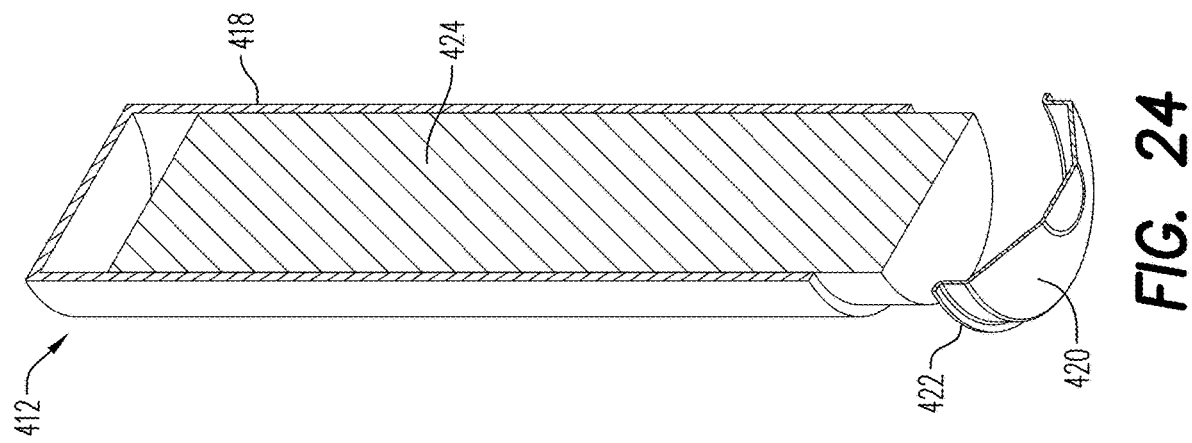
FIG. 24 is a partially disassembled view of the cartridge of FIG. 21.
Figure 23:
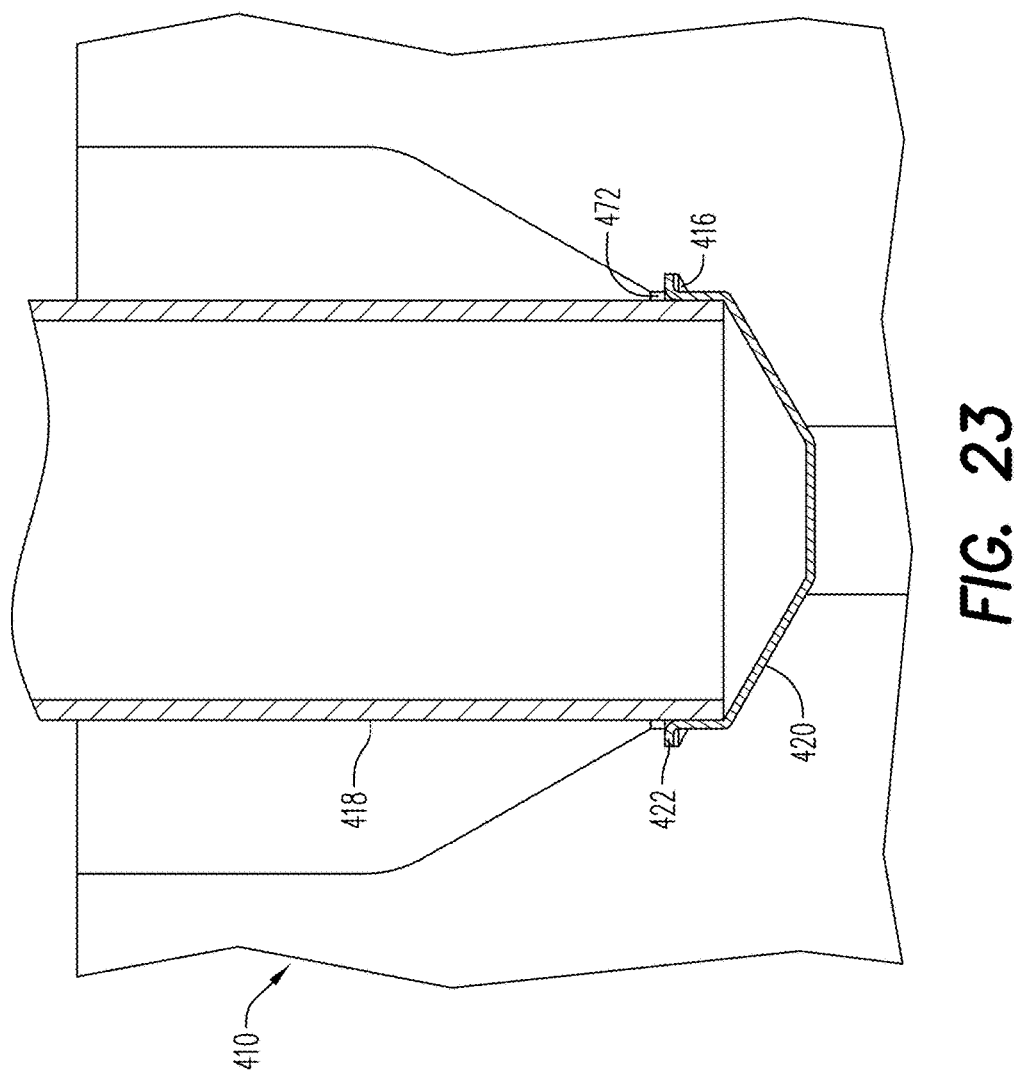
FIG. 23 is a magnified sectional view of the cartridge and mold of FIG. 22.

It should be recognized that cartridge 312 is illustrated with respect to FIGS. 13-18 by way of example in use with mold 310 that includes undercuts 316—namely to remove disk member 320 using both vertical and rotational interactions. Of course, it is contemplated by the present disclosure for cartridge 312 to find equal use with molds such as those illustrated in FIGS. 7A-9A—namely to remove disk member 318 using only rotational interaction. Thus, cartridge 312 is illustrated in FIGS. 19-20 further including pusher member 318-1 and retaining rim 318-2 in a manner similar to those described with respect to FIGS. 10-11 for use with this and/or other embodiments.

Other alternate exemplary embodiments of a weld-metal containing cartridge 412 and an exothermic reaction welding mold 410 according to the present disclosure are described with simultaneous reference to FIGS. 21-24. Component parts performing similar and/or analogous functions to those discussed above are labeled in multiples of four hundred and various elements that may or may have not been changed have been omitted for purposes of brevity.

Advantageously, mold 410 and cartridge 412 are configured to allow removal of disk member 420 from housing member 418 using only a vertical interaction between the disk member and mold 410.

Here, disk member 420 has an inner dimension that forms a press fit or interference fit with an outer dimension of housing member 418. Although not shown, it is further contemplated by the present disclosure for the press fit or interference fit between housing member 418 and disk member 420 to be formed between an inner dimension of the housing member and an outer dimension of the disk member.

Mold 410 includes undercut 416 that receives protrusions 422 of disk member 420 in a snap fit manner. For example, mold 410 can include a lead-in 472 that inwardly resiliently biases protrusions 422 during insertion of cartridge 412 into mold 410. Upon protrusions 422 clearing lead in 472, protrusions 422 are received in undercut 416 in a manner that prevents or restrains upward vertical movement of disk member 420, which allows the action of withdrawing housing member 418 from mold 410 to overcome the press fit or interference fit between housing and disk members 418, 420.

Without wishing to be bound by any particular theory, the inward resilient biasing protrusions 422 can be a function of the material properties and structure of one or more disk member 420, housing member 422, and combinations thereof.

Other alternate exemplary embodiments of a weld-metal containing cartridge 512 and an exothermic reaction welding mold 510 according to the present disclosure are described with simultaneous reference to FIGS. 25-29. Component parts performing similar and/or analogous functions to those discussed above are labeled in multiples of five hundred and various elements that may or may have not been changed having been omitted for purposes of brevity.

Advantageously, mold 510 and cartridge 512 are configured to allow removal of disk member 520 from housing member 518 using only a rotational interaction between the disk member and mold 510.

Figure 26:
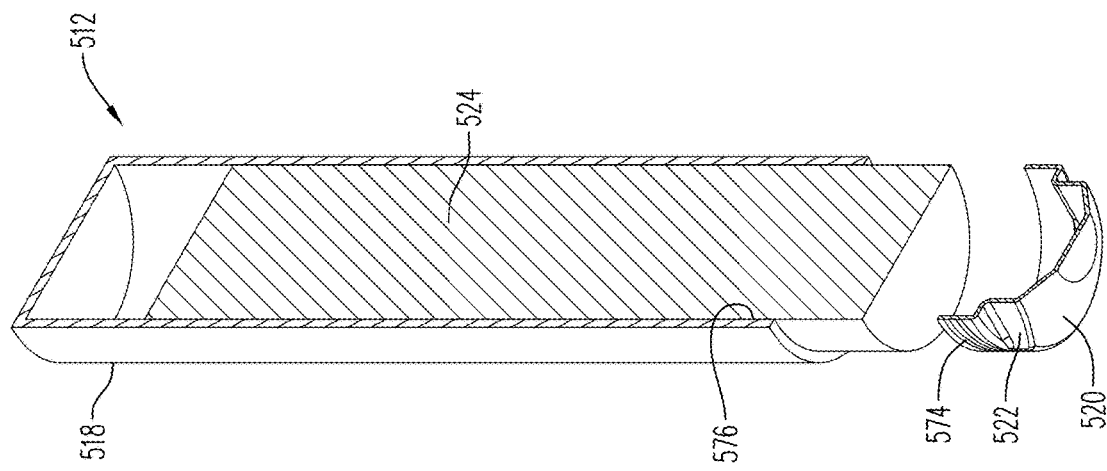
FIG. 26 is a partially disassembled view of the cartridge of FIG. 25.
Figure 25:
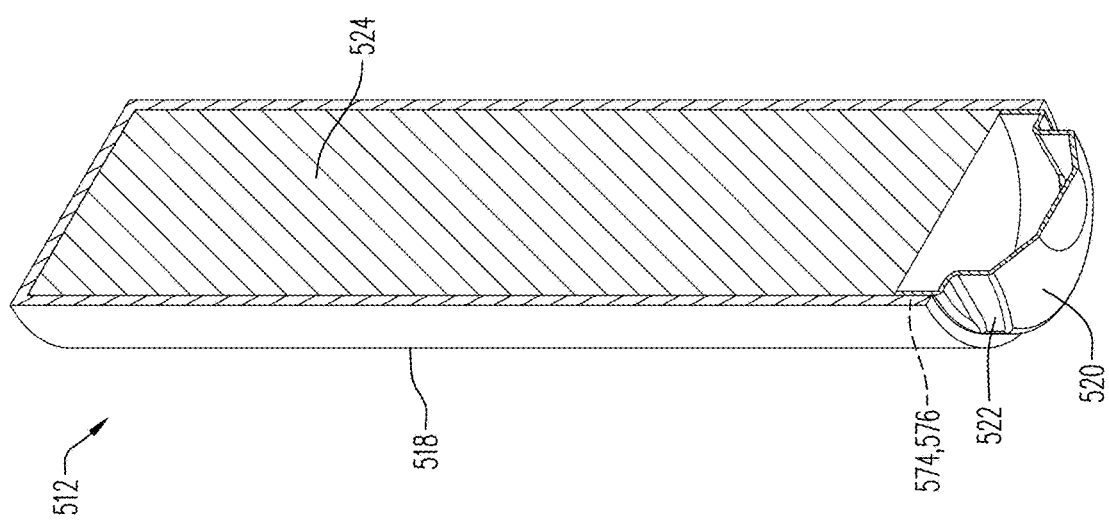
FIG. 25 is a bottom perspective sectional view of an alternate exemplary embodiment of a weld-metal containing cartridge according to the present disclosure.

In FIGS. 25-27, disk member 520 is illustrated having been threadably received on an inner dimension of housing member 518 by cooperating threads 574, 576, respectively. Conversely, disk member 520 is illustrated having been threadably received on an outer dimension of housing member 518 by cooperating threads 574, 576, respectively.

In order to facilitate the rotational restraint, disk member 520 includes one or more non-circular surfaces 522, illustrated as flat regions and mold 510 includes a corresponding number of non-circular mating surfaces 516, also illustrated as flat regions. In this manner, when cartridge 512 is inserted into mold 510 with surfaces 516, 522 adjacent one another, rotational movement imparted to housing member 518 is not translated to disk member 520, but rather results in cooperating threads 574, 576 unthreading from one another.

Although not shown in FIGS. 25-29, it is contemplated by the present disclosure for cartridge 512 to include a seal secured to housing member 518, where the seal can form a hermetic seal that prevents the egress of water and moisture into weld-metal 524.

Other alternate exemplary embodiments of a weld-metal containing cartridge 612 and an exothermic reaction welding mold 610 according to the present disclosure are described with simultaneous reference to FIGS. 30-31. Component parts performing similar and/or analogous functions to those discussed above are labeled in multiples of six hundred and various elements that may or may have not been changed having been omitted for purposes of brevity.

In this embodiment, the interaction between mold 610 and cartridge 612 impart an outward pressure on housing member 618 and/or disk member 620, a shear force on the housing member and/or disk member, or combinations thereof.

For example, disk member 620 can—in some embodiments be a pierceable foil—that has sufficient rigidity to temporarily seal off passageway 638 between reaction chamber 634 and the weld chamber to allow weld-metal 624, once ignited in the reaction chamber, to reach a desired temperature and/or reaction state before melting through the disk member and passing, under the effect of gravity, through the passageway into the weld chamber. Here, mold 610 can include elements 616 that interact with disk member 620 during insertion of cartridge 612 into the mold so as to pierce through the disk member the disk member—and thus separate the disk member from housing member 618.

In other embodiments, disk member 620 can be removably secured to housing member 618. Here, elements 616 interact with housing member 618 and/or disk member 620 during insertion of cartridge 612 into the mold so as to separate the disk member from housing member 618. For example, elements 616 can apply an outward force on housing member 618 sufficient to deflect the housing member outwards so as to separate disk member 620 from the housing member.

Advantageously, the exothermic welding molds, weld-metal containing cartridges for such molds, and methods of use of the present disclosure provide—in some embodiments—an interaction between the mold and the cartridge in a manner that allows for the removal of the disk member from the housing member once the housing member is within the mold. In some embodiments, the cartridges and molds of the present application use the same structure that removably secures the disk and housing members to one another to also allow removal of the disk member from the housing member and to ensure a positive fit or location of the disk member in the mold. In this manner, the molds, cartridges, and methods of the present application allow for an integrated mold-cartridge system in a simple, reliable, and repeatable manner.

Of course, it is contemplated by the present disclosure for the exothermic welding molds, weld-metal containing cartridges for such molds, and methods of use of the present disclosure to require no such interaction between the mold and the cartridge to assist in the removal of the disk member from the housing member.

Examples of non-interacting molds and cartridges are described in more detail below in which the disk member is removed from the housing member through an outward pressure on the housing member and/or disk member without interaction between the disk member and the mold, but rather by the simple application of an internal pressure to the cartridge. The internal pressure can be applied by squeezing the walls of the cartridge and/or by depressing a pusher member as discussed in more detail below.

Figure 33:
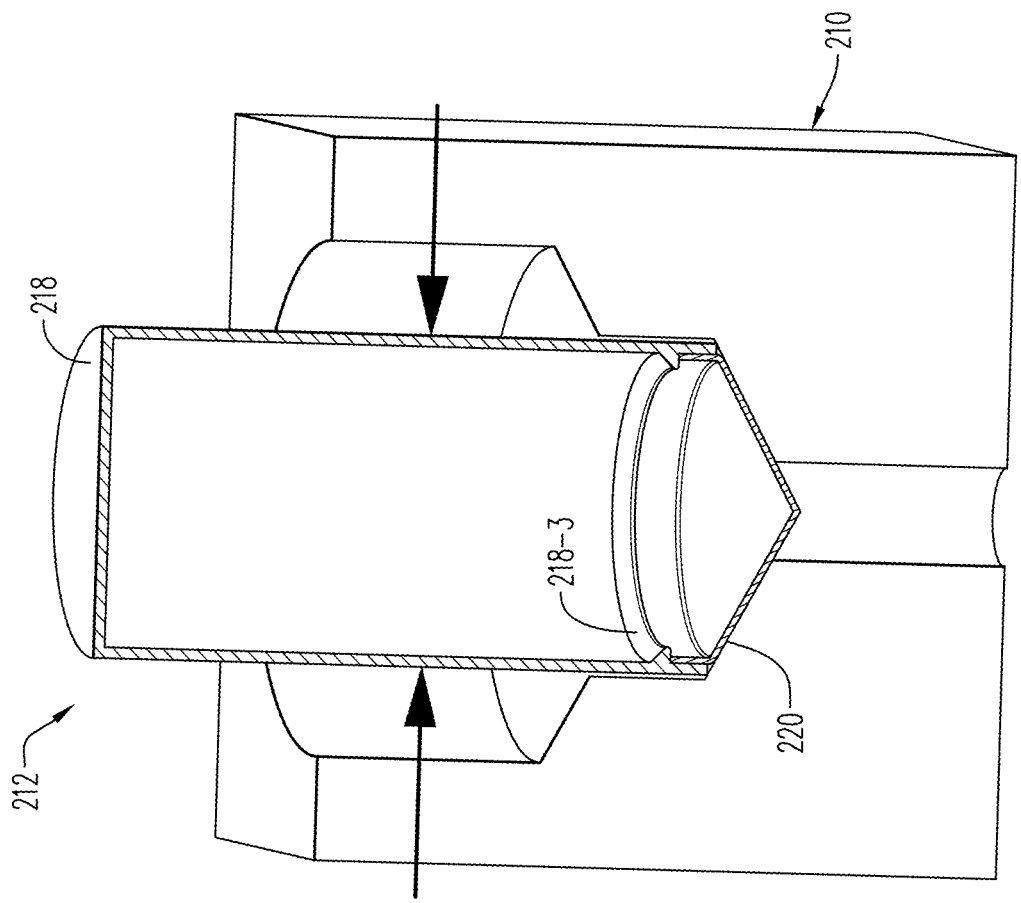
FIG. 33 is a sectional view of the housing member and removable disk member of FIG. 32 in use with a mold.
Figure 32:
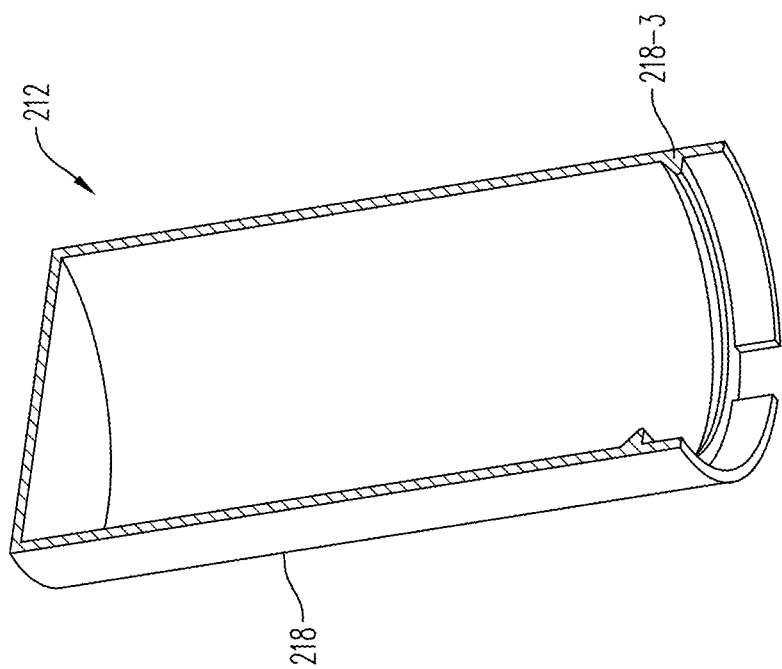
FIG. 32 is a side perspective sectional view of an alternate exemplary embodiment of a housing member according to the present disclosure.

Referring now to FIGS. 32-33, alternate exemplary embodiments of the housing member according to the present disclosure is shown and is generally referred to by reference numeral 218. Here, component parts performing similar and/or analogous functions to those discussed above are labeled in multiples of two hundred and various elements that may or may have not been changed have been omitted for purposes of brevity.

Housing member 218 can include a lower support rim 218-3 to abut against and support disk member 220 to ensure proper positioning of the disk member with respect to the housing member and to guide the flow of weld-metal (not shown) into the disk member.

After insertion of cartridge 212 into mold 210, outward pressure on housing member 218 and/or disk member 220 is provided without interaction between the disk member and the mold, but rather by the simple application of an internal pressure to the cartridge. In this embodiment, the internal pressure can be applied by squeezing the walls of housing member 218 radially inward as shown in FIG. 33.

Figure 35:
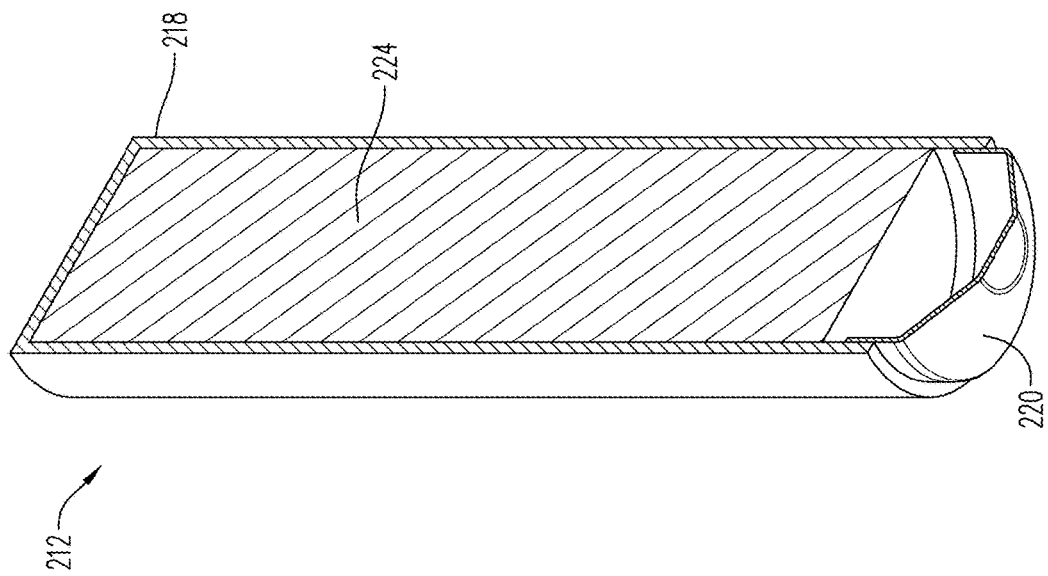
FIG. 35 is a bottom perspective sectional view of an alternate exemplary embodiment of the cartridge of FIG. 34.
Figure 34:
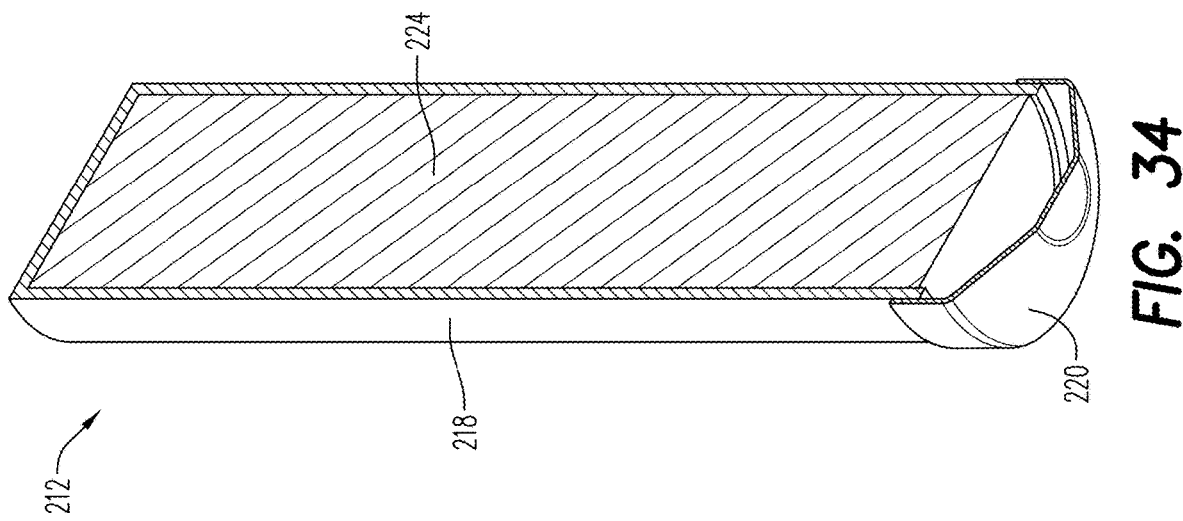
FIG. 34 is a bottom perspective sectional view of an alternate exemplary embodiment of a weld-metal containing cartridge according to the present disclosure.

It should be recognized that cartridge 212 is illustrated in FIGS. 32-33 as having disk member 220 secured by a press or interference fit into an internal dimension of housing member 218. Of course, it is contemplated by the present disclosure for cartridge 212, as illustrated in FIG. 34, to have disk member 220 secured by the press or interference fit to an external dimension of housing member 218 or for the disk member to have the structure as shown in FIG. 35—namely one that does not extend radially outward beyond housing member 218.

In each embodiment, the internal pressure applied to cartridge 212 by squeezing the walls of housing member 218 is sufficient to overcome the interference fit between disk member 220 and the housing member so as to disconnect the disk member from the housing member. In some embodiments, it is contemplated by the present disclosure that the squeezing the walls of housing member 218 also acts to deflect the housing member a sufficient distance to disconnect disk member 220 from the housing member.

Figure 37:
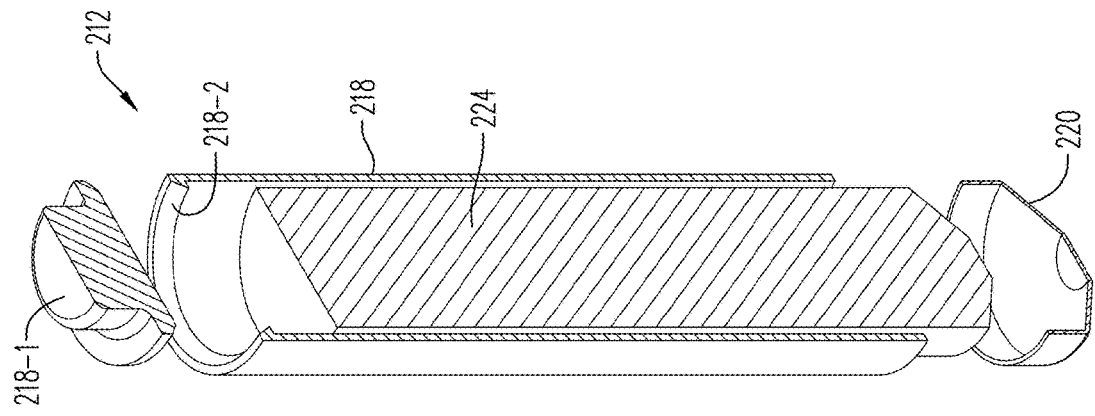
FIG. 37 is a partially disassembled view of the cartridge of FIG. 36.
Figure 36:
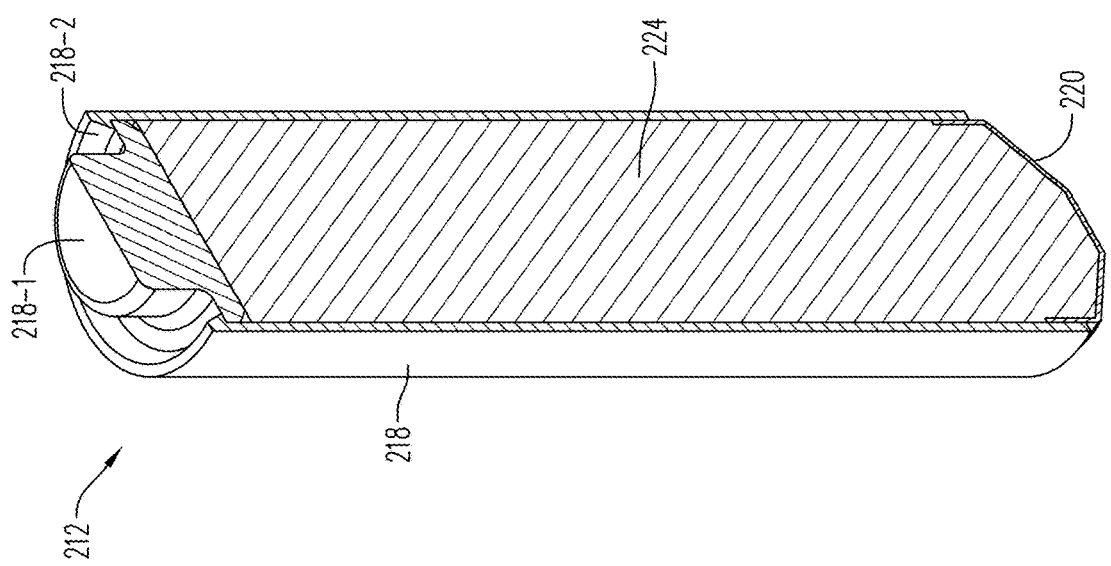
FIG. 36 is a bottom perspective sectional view of an alternate exemplary embodiment of a weld-metal containing cartridge according to the present disclosure.

It should be recognized that cartridge 212 is illustrated with respect to FIGS. 32-35 as requiring the user to apply the internal pressure by squeezing the walls of housing member 218. Of course, it is contemplated by the present disclosure for cartridge 212, as illustrated in FIGS. 36-37, to further including pusher member 218-1 and retaining rim 218-2 in a manner similar to those described with respect to FIGS. 10-11 for use with this and/or other embodiments.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. An exothermic reaction welding mold for use with a weld metal containing cartridge that has a removable disc member, the mold comprising:
   a reaction chamber;
   a weld chamber; and
   a passageway providing communication between the reaction chamber and the weld chamber,
   wherein the reaction chamber comprises a shoulder positioned above the passageway on which the removable disc member can be received to temporarily seal off the passageway,
   wherein the reaction chamber comprises a structure that is sized and positioned to interact with the removable disc member and/or the cartridge to remove the removable disc member from the cartridge.

2. The mold of claim 1, wherein the structure is sized and configured to interact with the removable disc member as both a rotational restraint and a vertical restraint so as to remove the removable disc member from the cartridge during removal of the cartridge from the mold.

3. The mold of claim 2, wherein the wall has at least one radially extending indentation defined so as to not extend through the wall to an exterior of the reaction chamber.

4. The mold of claim 3, wherein the at least one radially extending indentation further comprises an undercut area defined so as to not extend through the wall to the exterior of the reaction chamber.

5. The mold of claim 2, wherein the wall has at least one radially extending indentation defined so as to extend only partially through the wall of the reaction chamber.

6. The mold of claim 5, wherein the at least one radially extending indentation further comprises an undercut area defined so as to extend only partially through the wall of the reaction chamber.

7. The mold of claim 1, wherein the structure is sized and configured to interact with the removable disc member as only a rotational restraint so as to remove the removable disc member from the cartridge during removal of the cartridge from the mold.

8. The mold of claim 7, wherein the wall has at least one radially extending indentation defined so as to not extend through the wall to an exterior of the reaction chamber.

9. The mold of claim 7, wherein the wall has at least one radially extending indentation defined so as to extend only partially through the wall of the reaction chamber.

10. The mold of claim 1, wherein the structure is sized and configured to interact with the removable disc member as only a vertical restraint so as to remove the removable disc member from the cartridge during removal of the cartridge from the mold.

11. The mold of claim 10, wherein the wall has an undercut area defined so as to not extend through the wall to the exterior of the reaction chamber.

12. The mold of claim 10, wherein the wall has an undercut area defined so as to extend only partially through the wall of the reaction chamber.

13. The mold of claim 1, wherein the structure is sized and configured to interact with the cartridge by applying an outward pressure on the cartridge to remove the removable disc member from the cartridge during insertion of the cartridge into the mold.

14. The mold of claim 13, wherein the structure is sized and configured to interact with the cartridge by applying a shear force on the cartridge and/or disk member to remove the removable disc member from the cartridge during insertion of the cartridge into the mold.

15. The mold of claim 1, wherein the structure is sized and configured to interact with the cartridge by applying a shear force on the cartridge and/or disk member to remove the removable disc member from the cartridge during insertion of the cartridge into the mold.

16. An exothermic reaction welding mold for use with a weld metal containing cartridge that has a removable disc member, the mold comprising:
   a reaction chamber;
   a weld chamber; and
   a passageway providing communication between the reaction chamber and the weld chamber,
   wherein the reaction chamber comprises a shoulder positioned above the passageway on which the removable disc member can be received to temporarily seal off the passageway, and
   wherein the reaction chamber comprises a wall positioned above the passageway, the wall having at least one radially extending indentation defined so as to not extend through the wall to an exterior of the reaction chamber.

17. The mold of claim 16, wherein the at least one radially extending indentation further comprises an undercut area defined so as to not extend through the wall to the exterior of the reaction chamber.

18. An exothermic reaction welding mold for use with a weld metal containing cartridge that has a removable disc member, the mold comprising:
   a reaction chamber;
   a weld chamber; and
   a passageway providing communication between the reaction chamber and the weld chamber, wherein the reaction chamber comprises a shoulder positioned above the passageway on which the removable disc member can be received to temporarily seal off the passageway, and wherein the reaction chamber comprises a wall positioned above the passageway, the wall having at least one radially extending indentation defined so as to extend only partially through the wall of the reaction chamber.

19. The mold of claim 18, wherein the at least one radially extending indentation further comprises an undercut area defined so as to extend only partially through the wall of the reaction chamber.

* * * * *